United States Patent [19]
Djerf et al.

[11] Patent Number: 5,976,435
[45] Date of Patent: Nov. 2, 1999

[54] METHOD AND APPARATUS FOR PRODUCING COMPOSITE MATERIALS

[75] Inventors: Tobin Djerf; Gwen Damico, both of Grand Saline, Tex.

[73] Assignee: Evergreen Global Resources, Inc., Tyler, Tex.

[21] Appl. No.: 08/895,302

[22] Filed: Jul. 16, 1997

Related U.S. Application Data

[62] Division of application No. 08/200,782, Mar. 1, 1994, Pat. No. 5,649,785.

[51] Int. Cl.$^6$ .................................................. B29C 47/06
[52] U.S. Cl. .................. 264/112; 264/122; 264/173.12; 264/173.16; 264/920; 425/131.1; 425/133.1; 425/463
[58] Field of Search .................. 264/37.18, 37.19, 264/37.26, 112, 122, 173.11, 173.12, 173.16, 914, 916, 920; 425/130, 463, 131.1, 133.1; 251/DIG. 38

[56] References Cited

U.S. PATENT DOCUMENTS

| | | | |
|---|---|---|---|
| 2,806,249 | 9/1957 | Craig | 425/133.1 |
| 4,234,632 | 11/1980 | Lubowitz | 264/115 |
| 4,287,147 | 9/1981 | Hungerford | 264/173.16 |
| 5,125,819 | 6/1992 | Hager et al. | 425/133.1 |
| 5,217,655 | 6/1993 | Schmidt | 264/916 |
| 5,401,452 | 3/1995 | Lubowitz | 264/112 |
| 5,453,236 | 9/1995 | Daly | 264/122 |
| 5,614,227 | 3/1997 | Yarbrough | 425/133.1 |

*Primary Examiner*—Mathieu D. Vargot
*Attorney, Agent, or Firm*—Ronald B. Sefina

[57] ABSTRACT

A three phase method of treating solid waste to eliminate hazards and preserve the resource value of the constituent materials, separating and recovering the constituent materials, and productively using those constituent materials, includes, in the first phase, steps to separate ferrous metal constituents from the waste stream, shred and grind the solid wastes to generally uniform small particles, dry the waste material to remove essentially all free moisture and render the wastes biologically inert, compact the dried waste materials into uniform high density blocks, and encapsulate the compacted blocks; includes, in the second phase, steps to return the compacted blocks to uniform particles and separate the combined constituent materials on the basis of density, with primary processing utilizing a series of fluidized bed and cyclonic separator assemblies and with secondary processing utilizing combinations of vibratory conveyors, melt separation assemblies, and the like; and includes, in the third phase, steps to further separate and refine selected recovered materials by chemical treatment, prepare selected materials for reuse, and apparatus and method of producing a composite material by extruding a hollow body, pumping a slurry of particles and uncured binder material into the interior of the hollow body, and curing the binder material to create a solid core surrounded by an outer layer.

5 Claims, 21 Drawing Sheets

5,976,435

METHOD AND APPARATUS FOR PRODUCING COMPOSITE MATERIALS

RELATED APPLICATION DATA

This application is a Divisional of application Ser. No. 08/200,782, filed in the United States Patent And Trademark Office on Mar. 1, 1994, and titled "Method Of Treating Solid Waste, Recovering The Constituent Materials For Recycling And Reuse, And Producing Useful Products Therefrom", now U.S. Pat. No. 5,649,785.

FIELD OF THE INVENTION

The present invention generally relates to the field of solid waste management, including material recovery, recycling, and reuse, and in its preferred embodiments more specifically relates to solid waste processing, separating constituent materials from a mixed stream of solid waste materials, and utilizing the constituent materials to maximize their utility and resource value.

BACKGROUND OF THE INVENTION

Throughout most of history mankind has handled its solid wastes, particularly municipal wastes or garbage, by burying it or dumping it into bodies of water, but in the face of relatively recent recognition that improper handling of solid wastes can create short term and long term pollution problems, solid waste management has become a matter of increasing concern. Recovery of useable resources from solid wastes is another factor which has lead to increasing concern for proper management and utilization of solid wastes. Of the different types of solid waste, municipal solid waste is the most significant in terms of sheer volume and variety of composition.

Numerous approaches have been suggested and utilized for the handling of solid wastes, though disposal in landfills has been and continues to be the most widely used approach by far. Although disposal in properly constructed, operated and maintained landfills appears to be a relatively safe method of waste management over a short span of time, major concerns remain about the long term safety of even the best designed and operated landfills. Conventional landfills are constructed with a generally impervious liner to serve as a barrier against leaching of wastes into water supplies, but any breach in the liner results in failure of the entire containment system. Further, conventional design and operation of landfills for disposal of solid wastes fails to effectively address the potential for reuse of waste stream components as resources.

Incineration of is another approach which has been in long term use for disposal of solid wastes, sometimes alone and sometimes with recovery of energy from the heat of combustion. Again, while offering partial solutions and recovering at least some portion of the resource value of the incinerated wastes, incineration can produce air pollution, and the use of all waste components for heat is often an extremely inefficient approach to recovery of the resource value of many waste components.

Composting of municipal wastes is another approach which has been attempted, but which has failed to provide a comprehensive solution to the waste management problem. Although some components of municipal waste can be effectively composted, many components are not amenable to biological degradation or may retain toxic or hazardous characteristics through the composting process.

Source separation recycling, in which recyclable and/or reusable materials are separated from the waste stream by each waste generator and separately collected, has been strongly proposed as an effective and efficient solution to solid waste management problems. Source separation recycling, while effective in separating components from the waste stream in order to use their resource value, has met with a number of difficulties.

In the particular case of municipal wastes, source separation of wastes must be done by each waste generating household, and the willingness of the waste generators to participate in detailed separation programs is often a significant determining factor in the effectiveness of the separation, or recycling program. In even the most effective voluntary recycling programs, participation by household waste generators in source separation of wastes at all is not universal, and participation tends to drop as the complexity of separation increases. Problems also arise from errors made by municipal waste generators in identifying materials, resulting in commingling of recovered materials and reduction in the efficiency of separation. In response to the commingling problem, and often in an effort to increase participation, some recycling programs have provided for a combination of source separation and collection separation approaches. In the combined programs reusable materials are separated from other wastes and initially commingled, with additional separation performed as the wastes are collected from each generator. However, combined programs tend to slow waste collection and often require additional manpower, and any improvement in efficiency has been marginal at best.

Another approach that has been used in municipal recycling programs, either alone or in conjunction with separation by each waste generator, is post-collection separation, in which at least some part of the separation process is carried out after collection of wastes from individual households. Post-collection separation techniques range from simple and incomplete manual separation, based upon visual inspection of the waste stream and identification of recyclable materials, to more complex automatic systems utilizing techniques such as magnetic separation of ferrous metals, induction current separation of non-ferrous metals, and density separation in, e.g. water tanks. The effectiveness and efficiency of such separation techniques varies widely, and has proved to be only partially successful as an overall approach. The use of relatively large quantities of water in many conventional separation approaches also creates an environmental water pollution problem while attempting to solve a solid waste problem.

Conventional recycling and reuse approaches have also been plagued with economic problems, and recovered or recycled materials have often proved to be more costly than virgin materials due, at least in part, to inefficient handling, transportation of materials between fragmented processing and utilization facilities, the high cost of the final steps in material purification, and channeling of recovered materials into uses in which they must directly compete with virgin materials. For example, it is commonly perceived that the best recycling use of recovered materials is to return those materials to their original use, for production of the same products from which they were recovered in the waste stream, and while such full loop recycling may be the ideal approach, so long as the commercial economy provides virgin materials at lower cost the utilization of recovered material is suppressed and waste management problems remain unresolved.

There remains a need for an effective method of managing solid wastes, and particularly municipal solid wastes of both domestic and commercial character, so as to directly address and avoid the problems and difficulties of the prior art. There further remains a need for an efficient and cost-effective approach to utilization of recovered materials that coordinates the goal of maximizing recovery and reuse of waste materials with the need to channel those materials into uses that avoid or eliminate the suppressive effect of disadvantageous economic competition with virgin materials.

SUMMARY OF THE INVENTION

The present invention provides a comprehensive method of managing large volumes of solid waste to preserve the resource value of the constituent components while avoiding the problems associated with currently used disposal techniques; of effectively and efficiently separating the constituent materials from the original waste stream into substreams of combinations of materials and/or single materials selected for specific targeted uses while avoiding the problems associated with currently used separation techniques; and of utilizing the recovered and separated materials for the production of useful products selected and designed to maximize the utilization of recovered materials without the economic disadvantages discouraging such utilization, and for the production and direct utilization of useful energy from the waste materials. The method of the invention is designed to be practiced in three basic interrelated phases, each performing a necessary sequence of steps in the full processing of the original waste materials, with the intermediate output from each phase forming the input to the next phase in the interrelated sequence. The first phase of the method (sometimes referred to as Phase I) receives raw waste from collection and treats the entire stream to condition the waste and preserve the resource value of all constituents for later processing, the second phase (sometimes referred to as Phase II) separates the constituents into material streams as selected for use, and the third phase (sometimes referred to as Phase III) further refines selected portions of the material, produces useful raw materials and final products from constituents of the waste, and produces energy from selected materials for use in the operation of the processing facility or facilities. The phases of the method may be practiced in a continuous manner in a single coordinated facility, or may be practiced in either three separated facilities or in subcombinations of facilities. The method of the invention provides a great deal of flexibility in the processing and flow of materials through the processing steps, allowing materials to be drawn from the processing facilities at selected points in the full process, either for direct use or for routing to later processing steps, bypassing certain intermediate steps, as determined by the selected manner of use of the materials. The flexibility afforded in processing steps and material flow allows the method and processing facilities designed to practice the method to be specifically tailored to accommodate a wide range of raw waste compositions and a wide range of material utilization schemes, and thus provides a fully comprehensive approach to the solution of varied solid waste management problems.

Each phase of the method of the invention utilizes conventional apparatus insofar as possible, to facilitate construction and operation of facilities to practice the method, although the use of such apparatus for treatment of waste materials as provided by the method of the invention is not known within the prior art. The advancement represented by the method of the invention lies not only in the structure of the apparatus utilized, nor in the performance of each discrete step of the invention, but in significant part embodies the innovative utilization of conventional apparatus in a previously unknown combination, performing a previously unknown combination of steps, to produce a previously unknown result.

In Phase I the raw incoming waste is treated and dried to an essentially inert state and is drastically reduced in both volume and mass, making it economically feasible to transport the waste to appropriate locations for storage and resource recovery if desired. Since all constituents of the waste stream are reserved, all constituents remain available for separation and utilization in the second and third phases of the method. Further, because the treated waste may be easily transported and stored, constituents may be accumulated in sufficient quantities to support and economically justify further processing and utilization.

In a typical municipal waste handling system, waste is collected from individual households and other waste generators and placed in trucks for transportation to a landfill or other disposal site. In the first phase of the invention, the typical collection approach is utilized, but the waste is diverted to a processing facility rather than to disposal. The waste is unloaded from the initial transportation vehicles, passed through a "bag shredder" to open garbage bags or other waste containers and onto a material transport system, and the following basic steps are initiated. The total waste stream is first passed through a magnetic separation unit in which all ferrous metals are separated from the stream. Separation of other components from the waste stream may also be performed at this stage in the method, if desired, though such initial separation steps are not necessary. The waste is then dropped by the conveyor system into a shredder unit and subsequent grinder unit in which all waste constituents are shredded and ground to a preselected generally uniform physical dimension. From the shredder and grinder units the waste is conveyed to a sterilization and dryer unit in which the waste is sterilized and thoroughly dried to remove essentially all free moisture from the waste particles. From the sterilization and dryer unit the waste may be conveyed directly to the initiation of Phase II of the method, or may be conveyed to a binding and compaction unit in which the waste materials are compacted under high pressure to form uniform high density blocks. The binding and compaction steps will typically be utilized in the event that the Phase I facility is geographically separated from Phase II and/or Phase III facilities, or in the event that storage of some portion of the initially processed waste will be stored for later use in a contiguous facility.

If the binding and compaction steps are utilized, binding materials may be added to the dried waste particle mass if desired so that the compaction step produces cohesive blocks that will resist decrepitation and maintain the desired configuration during subsequent handling and transportation. Following the compaction step each block is shrink wrapped with a plastic film or otherwise coated with a generally impervious barrier material. The shrink wrapping or coating serves the dual purpose of maintaining the integrity of the block and sealing the block against material transfer across the barrier, preventing the waste materials from rehydrating and preventing the emission of, e.g., dust, from the block.

The primary sterilization, or deactivation, of the waste material is accomplished through the thorough drying of the waste at high temperature. It is preferred that essentially all free moisture, and as much of the cellular moisture as possible, be removed from the waste material, resulting in almost complete desiccation of the wastes. Biological degradation processes, both aerobic and anaerobic, require water, so the dehydration of the materials prevents continued biological activity by any bacteria and other microbial species which survive the heat of drying. However, a number of alternative sterilization and/or deodorizing approaches may be used in combination with the drying step within the method of the invention if desired or if conditions warrant. Such approaches include addition of deodorizing agents, chemical sterilization, using either gaseous or liquid sterilization agents, microwave sterilization, and irradiation sterilization with, e.g., sufficiently energetic gamma rays to kill biological organisms originally present in the waste materials.

While the method of the invention can be used to produce final blocks of waste materials in almost any size and shape, it is preferred that the blocks be formed in a configuration which facilitates both horizontal and vertical interlocking of blocks in a stable arrangement. The dimensions of the blocks should be selected so that the blocks may be efficiently placed on an appropriate transport vehicle, such as a rail car or a semi-trailer for transport. While awaiting use in a contiguous facility or while awaiting transport to and after arrival at a different location, the blocks may be arranged in direct contact with no free space, maximizing the volume of waste that may be stored in a given volume or land area.

In Phase II of the method of the invention a wide variety of constituent components are continuously and automatically separated from the solid waste stream treated and conditioned in Phase I. It will be recognized that while Phase II of the method of the invention is preferably and most effectively utilized in the context of the full scope of the method, it may be adapted for use as the sole approach to separation and segregation of materials from a waste stream, or may readily be used in conjunction with source separation, combined source and collection separation, or preliminary post-collection separation techniques to recover materials either not addressed by or missed by such preliminary separation techniques. In the preferred embodiment of the invention ferrous metals have been previously separated from the waste stream, at least in major part, though separation of ferrous metals in Phase II may readily be addressed in an alternative step of the method. In the following summary of the steps of Phase II of the method it is assumed that the waste materials to be separated have not been compacted or encapsulated in Phase I, although the Phase II processing can be readily adapted to break down compacted blocks of material transported from a physically separated Phase I facility or temporarily stored before introduction to Phase II from a contiguous Phase I facility.

Phase II of the method of the invention utilizes a series of fluidized beds and cyclonic separators to separate materials with air flow on the basis of density, utilizes vibratory conveyors to separate materials on the basis of density, and also contemplates the use of controlled temperature conveyor belts to separate plastic materials having generally similar densities but different melting points. The use of fluidized beds and cyclonic separators for density separation, with air as the separation fluid, eliminates the use of water in the separation process and also eliminates the use of wash water for cleaning of materials, thus eliminating the discharge or release of contaminated or polluted water. In the preferred embodiment of the method the air used for separation is recirculated in a generally closed system, essentially eliminating air pollution concerns as well.

In the practice of Phase II of the method of the invention the prepared waste materials, previously ground to a generally uniform particle size and thoroughly dried, are fed to the first of a series of fluid separation assemblies, each including a fluidized bed unit and a cyclonic separator unit. Separation air is forced into and through the fluidized bed unit of the first separator assembly at a controlled velocity from the bottom of the fluidized bed of waste materials to the top. As the air flows through the fluidized bed unit it encounters and lifts, or fluidizes, the discrete particles of waste material making up the bed, whereupon lighter particles are entrained in the air stream and carried from the top of the fluidized bed unit and introduced into the cyclonic separator of the first separation assembly in the series. Heavier materials fed to the first fluidized bed unit are not entrained in the air stream and fall to the bottom of the unit, where they are removed and routed to a vibratory conveyor unit of the first separation assembly. In the cyclonic separator of the first separation assembly air is forced into and through the cyclonic separator at a controlled velocity from the bottom of the separator to the top. Waste materials are fed into the air stream, and as the air encounters the discrete particles of waste material entering the separator, lighter particles are entrained in the air stream and carried from the top of the cyclonic separator and into a transition unit between the first and subsequent separation assemblies in the series. In the transition unit, which is of larger volume than the cyclonic separator, the velocity of the air leaving the cyclonic separator is reduced sufficiently for all entrained materials, except dust and fines, to drop out of the air stream. The particles of waste material are routed from the transition unit to a feed hopper for introduction to a subsequent separator assembly in the series. The air is routed from the transition unit through filters to remove the dust and fines, and the air is returned in a closed loop to the fluidized bed unit of the first separator assembly to repeat the path through the assembly. The dust and fines are recovered from the filters for disposal or use. Heavier materials in the stream fed to the first cyclonic separator unit from the first fluidized bed unit are not entrained in the air stream and fall to the bottom of the unit, where they are removed through an air lock and routed to the same vibratory conveyor carrying heavier materials from the fluidized bed unit.

Because the particles of waste are of generally uniform size, the division of the particles into an entrained stream and a non-entrained stream is based on the density of the particles, and both particle feed rate and velocity of the separating air may be controlled within specifically defined ranges so that each division of the particle stream may be made around a preselected density. Since the densities of waste materials are known and/or easily determined, the components present in each of the entrained and non-entrained streams can be determined and controlled with a reasonably high degree of accuracy. In the first separator assembly the entering stream of waste materials is divided into two streams; a heavy stream containing all materials with densities below the first separation value, and a light stream containing all materials with densities above that value. Each stream is further refined in subsequent separation assemblies until the desired degree of separation is achieved.

The heavier, i.e. higher density, material stream is carried from the first separation assembly by the conveyor and is routed to a second separation assembly, which also includes a fluidized bed unit and a cyclonic separator unit. The separation process performed in the second separator assembly is conceptually identical to the first separator assembly process, with modifications in equipment capacity and operating parameters appropriate to the material volume and density divisions to be achieved in the second separator assembly. In the second separator assembly the single stream of heavier particles from the first assembly has been further refined into two streams, each containing materials with densities above or below the control density established for the second separator assembly. Either or both of those streams may be further treated in subsequent separator assemblies, or may be routed to storage.

The stream of lighter materials from the first separator assembly is fed from the feed hopper to a third separator assembly, also including a fluidized bed unit and a cyclonic separator unit, where the materials are again separated by density into two exit streams. Either or both of those streams may be further separated in additional similar separator assemblies. After the final separator the velocity of the air stream is reduced in a final transition unit where particles with the lowest selected density are allowed to drop out of the air stream. The separation air is then passed through a filtering and the filtered air is returned to the beginning of the loop.

It will be understood that the air flow separation technique may be used to achieve a separation of a heterogenous stream of waste materials into a plurality of streams, each including materials with densities spanning a specific targeted range, and that the density range for each stream may be selected by modifying the operating parameters within each air flow separation assembly.

The particles removed from the bottom of each separator may be subjected to further separation processing, depending upon the composition of the respective bottoms stream and the intended use for the material in each bottom stream. The particular separation technique or techniques used to further separate components contained within each bottom stream is selected based upon the types of material involved. Particular techniques include, but are not limited to, magnetic separation, vibratory bed separation, and melt separation.

In the event the waste materials entering the separation process contain ferrous metals, and those metals are not removed prior to entry into the first cyclonic separator, the bottom materials in which ferrous metals have been deposited may be passed through a conventional magnetic separator unit to remove and recover the ferrous metals.

Vibratory conveyors may be used to separate materials of different densities that have been deposited in the same bottom stream or streams from one or more of the primary separators. In one approach to vibratory conveyor separation, a continuous conveyor, or each of a series of "end to end" conveyors, is inclined across the width of the conveyor so that one edge is raised above the opposite edge, vibratory motion is transmitted from a vibrator motor to the conveyor or conveyors. Material is continuously fed onto the front end of the conveyor at the elevated edge. As the conveyor moves, carrying the material along the length of the conveyor, heavier (i.e., more dense) material moves across the width of the conveyor more rapidly than does lighter material, in response to gravitational forces, and is allowed to drop from the edge of the conveyor. Since the particles fed onto the conveyor are of uniform size, the movement of the particles across the conveyor, and thus the location at which particles drop from the conveyor, is a function of density. Material particles dropping from the conveyor at different points along the length of the conveyor are collected and routed to further processing stages or stored.

Other techniques, such as melt separation, are used to further separate materials, such as different types of plastics, that have similar densities but different melting points. In melt separation the material to be separated is fed onto a series of conveyors in a thin layer essentially one particle thick, with each conveyor in the series heated to a temperature generally equal to the melting temperature of a specific type of plastic. Plastic materials with the lowest melting point begin to melt when placed in contact with the first conveyor and the particles of that type of plastic adhere to the conveyor. As the first conveyor turns over the final roller to begin the return portion of the conveyor loop, non-adhered particles fall from the first conveyor onto the second conveyor in the series and the adhered particles remain attached to the conveyor surface until they are mechanically removed by, e.g., a scraper blade. This sequence of steps is repeated with the second and subsequent conveyors at respectively higher temperatures until all the plastic materials have been separated and removed.

It will be understood that the operating parameters of Phase II of the method may be adapted within the scope of the invention to achieve various degrees of separation, in terms of both the overall separation results and the separation specificity that may be achieved within each step. The adaptations or adjustments may be made in response to the types of materials in the initial waste stream to accommodate parameters such as varying levels of preliminary separation, or in response to a selection of desired output materials and the degree of separation of those materials desired. For example, the operating parameters may be designed and adjusted to result in essentially complete separation and removal of heavy inorganic materials, such as metal and glass, and plastic materials for sale or direct utilization in Phase III of the comprehensive method, leaving the majority of compostable organic materials unseparated for routing to a Phase III composting operation. In a further example, paper materials may be removed for use in Phase III or for sale to a third party paper recycling operation. Phase II of the method is designed to allow a wide range of operating parameter adjustment while using the same physical equipment, providing an extremely flexible approach to material separation and resource recovery.

In Phase III of the method of the invention the constituent materials separated in Phase II are further refined and/or combined for the production of useful products for commercial use, or are utilized for the production of energy in various forms for use in the facility for practicing the method of the invention and/or for distribution. The preferred embodiment of Phase III includes several sub-phases, each of which receives treated and separated raw materials, including an aluminum profile extrusion sub-phase to utilize recovered aluminum; a plastics refining sub-phase using solvent extraction to reduce recovered plastic polymers to their original monomers, remove contaminants and additives such as catalysts, colorants, and antioxidants, and segregate the monomer resins for utilization in other sub-phases or for sale; a polymerizing/pelletizing sub-phase to produce plastics for use in other sub-phases or for sale; a plastic injection molding sub-phase to utilize recovered plastics in the production of commercial products; a plastics blow molding sub-phase to utilize recovered plastics in the production of commercial products; a plastics extrusion sub-phase to utilize recovered plastics in the production of commercial products; a composite extrusion sub-phase to combine materials with little independent commercial value with recovered plastics in the production of composite materials useful for, e.g. wood replacement; a fuel material sub-phase to combine combustible materials with little independent commercial value with low grade combustible residues from the plastics refining sub-phase to produce useful fuels; and a composting sub-phase to convert recovered organic materials to fertilizer and compost for agricultural use. An incinerator/power plant, designed to convert waste materials to steam for process heating and/or generation of electricity, is also associated with Phase III.

The aluminum extrusion sub-phase, the plastic injection molding sub-phase, the plastic blow molding sub-phase, the plastic extrusion sub-phase, the composting sub-phase, and the incinerator/power plant sub-phase are, as discrete processes, conventional and known to those of reasonable skill in those fields. The novelty and advancement represented by the inclusion of those sub-phases in the method of the invention lies in the inclusive nature of the full method and the substantial gains in efficiency realized by linking those production processes with the Phase I and Phase II material treatment and separation techniques to achieve commercial viability.

In the plastics refining sub-phase of Phase III, which may be used instead of or in conjunction with the melt separation techniques of Phase II of the method, plastic materials to be segregated and refined and introduced to a solvent extraction reactor vessel, and solvent is introduced under selected and controlled conditions to dissolve and depolymerize one of the combined plastic materials. The solvent and dissolved plastic, which is reduced to a monomeric resin, is drawn in liquid form from the reactor vessel and conveyed to a filtering unit, while the undissolved plastics are conveyed to a second extraction reactor vessel. The liquid solution is forced through a series of filters in the filtering unit to remove contaminants and additives, and the cleaned solution is conveyed to a solvent recovery unit. In the solvent recovery unit the solvent is recovered through, e.g., vacuum distillation and returned to a holding tank for reuse, and the remaining refined resin is routed to a storage container for subsequent use or sale. These steps are repeated in and downstream of the second solvent extraction reactor vessel to segregate and refine a second plastic material in the same manner. The sequence of steps is repeated through a series of extraction reactor vessels, filtering units, and recovery units as determined by the composition of the original plastics stream and the desired scope of segregation and refining. The segregated monomeric resins are available as raw materials for use in several of the sub-phases identified above, including the composite extrusion sub-phase.

In the composite extrusion sub-phase a monomeric resin, such as but not limited to polyvinyl chloride, is conventionally prepared for extrusion by addition of polymerization catalyst, colorant additives, and other desired additive materials. The prepared or activated resin is extruded into a continuous hollow profile through a unique extrusion die assembly which provides an internal passage for the introduction of a filler material into the hollow interior of the extrusion profile as the profile is extruded from the die assembly. The filler material is prepared by mixing particles of dry waste material, of almost any composition, prepared through Phase I and Phase II processing, with a sufficient quantity of a discrete or suitable mixture of monomeric resins from the plastic refining sub-phase of Phase III to coat and surround the particles. After complete mixing of the waste particles with the monomeric resins a suitable, preferably heat activated polymerization catalyst is added, and the mixture is pumped through the die apparatus into the interior of the extrusion profile shortly following exit from the extrusion die. The residual heat of the extrusion profile activates the catalyst in the filler material mixture, and the resin polymerizes to encapsulate and bind the particles in a rigid plastic matrix. The resulting composite material is cut into desired lengths for use, generally as a wood replacement material, in a wide variety of applications. The composite material may be produced at very low cost, since it comprises primarily waste materials with a limited quantity of plastic resin, and is very well suited for use in most applications in which wood materials are traditionally employed.

In the fuel material sub-phase, combustible waste materials which are not suited for other uses or are available in quantities in excess of those required for other uses, are combined with low grade combustible materials, such as paraffins, recovered in the plastics refining sub-phase, and compacted into configurations such as logs, pellets, or the like for commercial use as fuel.

The method of the invention, which is initiated with receipt of raw waste materials and is culminated with the production of a wide and flexible variety commercially valuable and useful products, provides a comprehensive solution to the problems of solid waste management, and achieves the objects of substantially reducing or eliminating the need for disposal of many solid waste constituents, reducing or eliminating biological hazards associated with solid waste handling and management, providing an economical and efficient approach to the separation and recovery of useable materials from solid wastes, and achieving commercially viable means of utilizing the resource value of those materials. The steps and features of the method of the invention and its conceptual phases will be described in more detail with reference to the accompanying drawing figures.

DETAILED DESCRIPTION OF THE INVENTION

Figure 1:
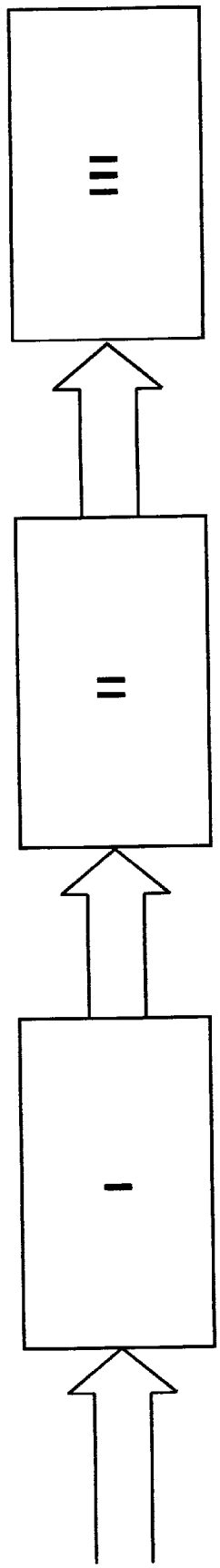
FIG. 1 is a block flow diagram showing generally the alignment of Phase I, Phase II, and Phase III of the method of the invention.
Figure 2:
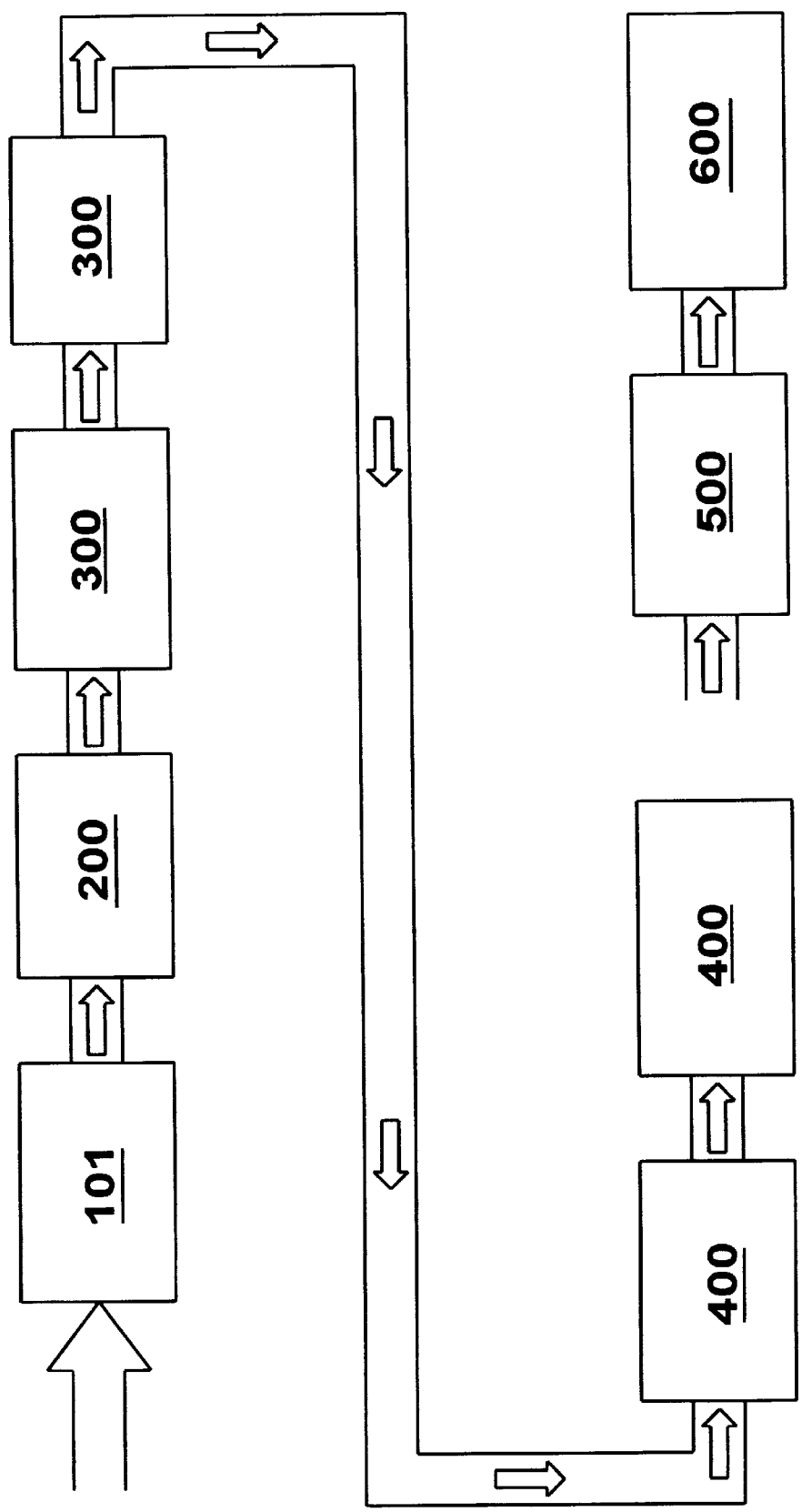
FIG. 2 is a block flow diagram showing the steps of Phase I of the method of the invention.

The accompanying drawing figures schematically illustrate the basic steps of the preferred embodiment of the consolidated three phase method of the invention and the movement of waste materials through apparatus used to practice the method. The drawing figures also schematically illustrate the steps of each phase of the method of the invention, illustrate the movement of waste materials through apparatus used to practice each phase of the method, and generally illustrate the basic structure and operation of certain equipment preferred for efficient operation of each phase and thus of the overall method. In the following description the steps and operation of each phase will be described in sequence with reference to the drawing figures, and selected non-limiting alternative embodiments and variations comprehended within the scope of the invention will also be described. FIG. 1 is a general schematic block diagram showing the material flow alignment of Phase I, Phase II, and Phase III of the method of the invention, with each phase designated by the respective Roman numeral.

Phase I of the preferred embodiment of the method includes the following basic steps: (1) magnetic separation of ferrous metals from the waste stream and diversion of separated metals from further processing, (2) shredding and grinding of waste materials to a preselected generally uniform particle size, and (3) heated air drying of the waste materials to a preselected moisture level. As summarized above, the method of the invention also contemplates the additional alternative steps of, (5) compaction of dried waste materials into dense discrete blocks, and (6) individual encapsulation of the blocks to prevent material transfer across the encapsulation barrier.

Figure 3:
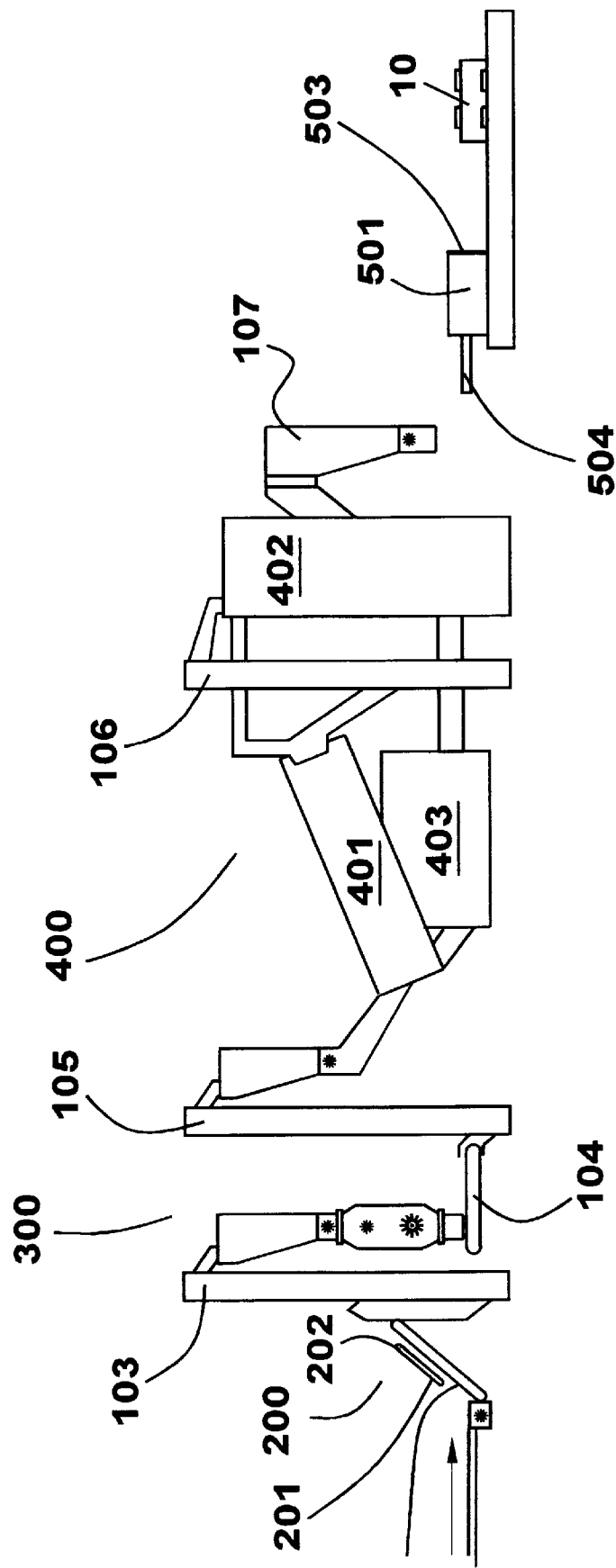
FIG. 3 is a schematic side view illustration of a facility for practicing the steps of Phase I of the method of the invention.
Figure 4:
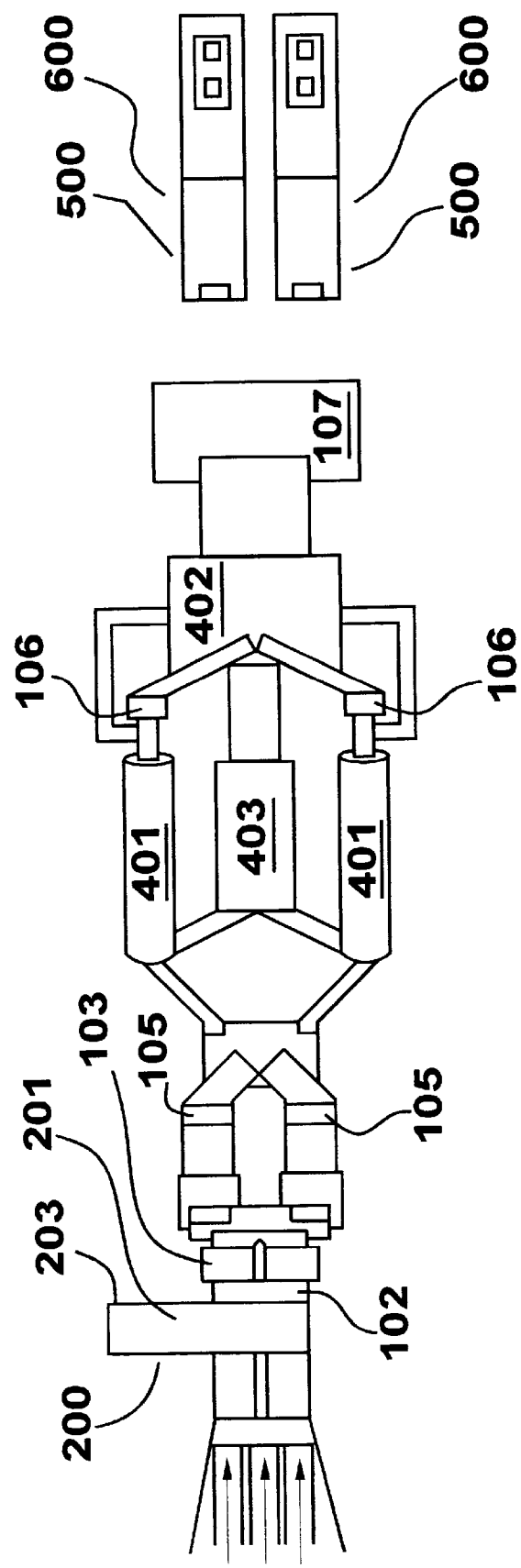
FIG. 4 is a schematic top view illustration of a facility for practicing the steps of Phase I of the method of the invention.

Each step utilizes certain apparatus to perform the operations of Phase I of the method. As seen in FIGS. 3 and 4, the apparatus may be conceptually divided into the following discrete assemblies: a magnetic separator assembly 200, a shredder/grinder assembly 300, and a dryer assembly 400, along with, if desired, a compaction assembly 500, and an encapsulation assembly 600. Since compaction assembly 500 and encapsulation assembly 600 are alternatives to the preferred embodiment but may be readily utilized for the purposes outlined above, they are shown with the assemblies of the preferred embodiment but separated from those assemblies to emphasize their alternative character. Material is moved into, through, and between the identified assemblies by material transport assembly 100.

At the initiation of the method raw waste material is unloaded from transport vehicles and introduced into Phase I processing, preferably through a "bag shredding" unit 101, in which garbage bags and other containers are torn or shredded to release the waste materials and ensure their accessibility for processing. From bag shredder 101 the waste materials are placed on conveyor 102, a conventional continuous belt system driven by, e.g., electric motors. Conveyor 102 moves the raw waste material to magnetic separator assembly 200 for the purpose of magnetically separating and removing ferrous metals from the raw waste stream before further processing. In the preferred embodiment, magnetic separator assembly includes a continuous magnetized belt 201, extending around a lower roller 202 and an upper roller 203. Magnetized belt 201 passes over the waste material on conveyor 102. As constituent items of the waste material made of or containing significant quantities of ferrous metal come into proximity to magnetized belt 201 such items are attracted to belt 201. As belt 201 moves over upper roller 203 the ferrous metal constituents are removed from belt 201 for storage, transport, or further processing. The non-ferrous constituents continue along conveyor 102 to bucket elevator system 103 of material transport assembly 100.

Following removal of ferrous metals from the waste stream in magnetic separator assembly 200, the remaining waste materials are conveyed by bucket elevators 103 into shredder/grinder assembly 300, where the waste materials are initially shredded as the first step in reduction of all non-ferrous waste materials to a uniform particulate size. In the preferred embodiment of the invention shredder/grinder assembly 300 comprises a series of shaft-mounted rotating shredder/grinder cutter units, with each of such series of cutter units further reducing the particle size until the optimum particle size is achieved. It is preferred that each shredder unit be physically segregated from the other units and enclosed in a sturdy housing suitable to contain the force of explosion, in the event an explosion is triggered during the shredding operation. It may be expected that such an explosion would damage or destroy the shredder in which it occurs, and the housing is intended to prevent or limit damage to surrounding equipment. As a non-limiting example, shredding/grinding apparatus manufactured by Shred-Tech, Inc. of South Carolina, U.S.A. provides suitable performance, as will apparatus of similar capability and capacity from other manufacturers. It is preferred that a final particle size of one-eighth inch to one-fourth inch in maximum dimension be achieved in shredder/grinder assembly 300.

The particles of shredded waste material exiting shredder/grinder assembly 300 are deposited on continuous belt conveyor 104 and conveyed to bucket elevator unit 105 of material transport assembly 100 for introduction into dryer assembly 400, in which the waste materials are dried to remove essentially all free moisture from the materials. In the preferred embodiment moisture is removed from the waste materials to reduce the final moisture content to about five to ten parts per million, sufficient to terminate biological degradation and other biological activity, and to maintain the moisture content below the level at which any surviving microbial organisms are able to resume activity. As a result, the waste materials are effectively sterilized and rendered biologically inert, preventing the spread of contamination and allowing such materials to be stored for extended periods without degradation and without destruction of the resource value of degradable components. In the preferred embodiment, dryer assembly 400 utilizes a heated air stream to vaporize moisture present in the waste materials and drive the resulting vapor from the waste materials, and includes inclined rotating drum dryer units 401 and fluidized bed dryer units 402. Heated, dehumidified air from drying air preparation unit 403 is passed through dryer unit 402 and then dryer units 401 counter to the direction of movement of the waste materials, and is then routed back to unit 403 for moisture removal and heating. Drying air preparation unit 403 may use any convenient system for moisture removal, such as desiccant drying or condensation. In the preferred embodiment of the method, the majority of the moisture is removed from the waste materials in dryer units 401, and dryer units 402 serve to complete the moisture removal operation and to temporarily hold variable quantities of the waste material prior to introduction to compaction assembly 500. As illustrated, waste materials are conveyed from rotating drum dryer units 401 to fluidized bed dryer units 402 by means of bucket elevators 106. As with other apparatus used in the performance of each step of the method of the invention, dryer units 401 and 402 may be of any convenient conventional design and size suitable for achieving the preferred final moisture content of the selected quantity of waste materials to be treated in the selected apparatus. It is preferred, however, that the drying air used in dryer assembly 400 be recirculated in a closed loop system through dryer units 401 and 402 and air preparation unit 403, to prevent the emission of air borne odors from the waste. Design and selection of dryer units 401 and 402 is within the skill of a skilled practitioner in the field of continuous material drying operations.

Figure 9:
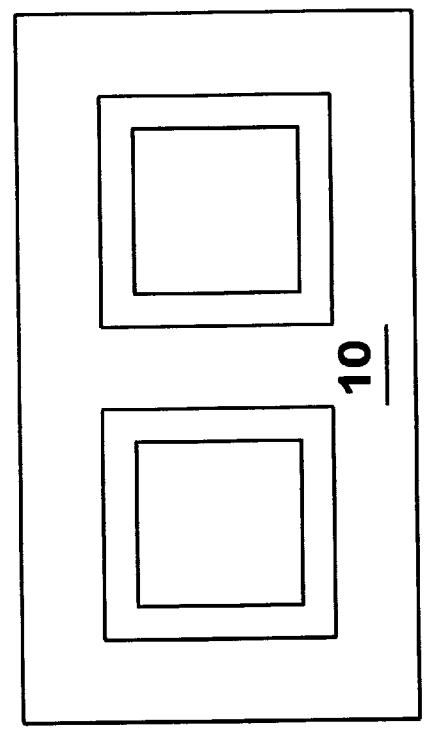
FIG. 9 is a top plan view of an example of the configuration of a block of compacted waste material alternatively produced In Phase I of the method of the invention.
Figure 8:
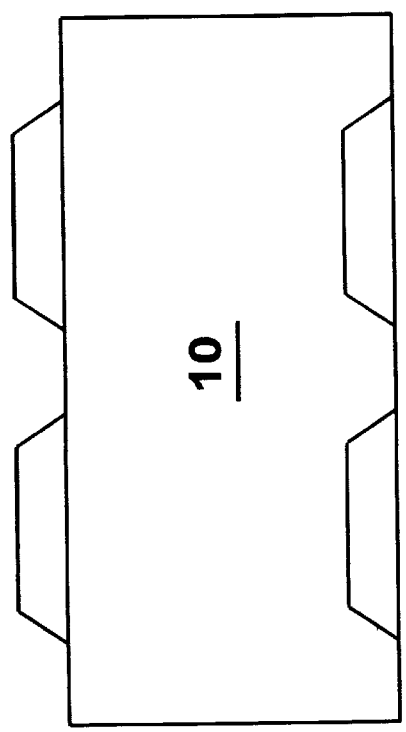
FIG. 8 is a side elevation view of an example of the configuration of a block of compacted waste material alternatively produced in Phase I of the method of the invention.

When the waste materials have been dried to the selected moisture level the particles are, in a combined facility, conveyed to Phase II and/or Phase III of the facility for further immediate processing or use, as described below. The materials may also be routed to short term storage prior to introduction to Phase II or Phase III. In a further alternative, in the event the treated waste materials are to stored for an extended period, or will be transported to another location before further processing and use, the materials may be conveyed to compaction assembly 500, to be compacted under high pressure into cohesive, high density blocks, generally identified by reference numeral 10, of inert waste material. It is preferred that the blocks be generally configured as rectangular solids with interlocking configuration on each face, as illustrated in FIGS. 8 and 9, to facilitate stacking of blocks in a stable arrangement, though it will be understood that the compacted blocks may be produced in any convenient configuration within the scope of the invention. The compaction of the materials into blocks is achieved by the application of high pressure to a confined mass of the waste materials, and may be performed in a single stage or in multiple stages. In the alternative embodiment utilizing the compaction and encapsulation steps, materials exiting dryer assembly 400 are deposited in feed hopper 107 of material transport assembly 100, and are fed from feed hopper 107 for compaction in batch loads. It will be understood that the flow of material through the apparatus preceding compaction assembly 500 is continuous in the preferred embodiment of the method, whereas the compaction of the treated materials into blocks is a batch operation. Materials are deposited from feed hopper 107 into compaction chamber 501 between moving compaction plate 502 and wall 503. Compaction plate 502 is driven by piston 504 toward wall 503 until the desired density of the compacted material is achieved. It is preferred that the material be compacted sufficiently to substantially eliminate air spaces between particles and eliminate the presence of channels from the exterior surface into the interior of the block so as to resist any movement of water and air into the interior of the compacted block. In addition to application of compaction pressure, vacuum may be applied to compaction chamber 501 to aid in the removal of air from the materials during compaction.

Because the waste materials have been reduced to small particles of generally uniform size, the effect of compaction, with or without the application of vacuum, is primarily elimination of air spaces between particles and the compacted blocks exhibit a limited tendency to expand following completion of the compaction step. However, the post-compaction integrity of the blocks may be ensured, if desired, by the addition of an adhesive agent to the materials prior to compaction, or the surfaces of the compacted blocks may be treated with a stabilization agent, if desired.

Following compaction of the waste materials into discrete blocks, each block is encapsulated with a protective material to form a physical barrier against transport of material from the block to the surrounding environment, and from the surrounding environment to the block. It is preferred that encapsulation assembly 600 be combined with compaction assembly 500, when used, and each compacted block is wrapped with a heat-shrinkable plastic wrap to fully surround the block and sufficient heat is applied to the wrapping material to shrink the wrapping material tightly around the block. As an alternative to heat-shrinkable wrap, stretch wrap may be used to achieve the same result. In addition to providing a barrier to material transport, the encapsulation of each block also serves to stabilize and maintain the configuration of each block, generally eliminating any need for addition of adhesive to the waste materials prior to compaction and for independent stabilization treatment of the surface of the blocks. It will be understood, however, that encapsulation approaches other than shrink wrap encapsulation and stabilization may be employed, if desired. For example, the surface of each block may be treated with a flowable material that cures to form an impermeable skin with sufficient tensile strength to maintain the physical integrity of the block. As a further alternative, a formed liner of, e.g., heavy plastic, configured as an open sided cube, may be placed in compaction chamber 501 prior to introduction of the waste material for compaction, such that the material is compacted into the liner. When the compaction operation is completed and the compacted block ejected from compaction chamber 501 the open end of the liner is then sealed. Additional physical restraints, such as perimeter bands, may also be used if desired with any of the encapsulation means to further secure the physical integrity of the blocks.

The previously described steps of Phase I of the method of the invention are susceptible to various additions and alternative approaches. In one alternative, chemical treatment of waste materials may be employed for odor control.

Figure 5:
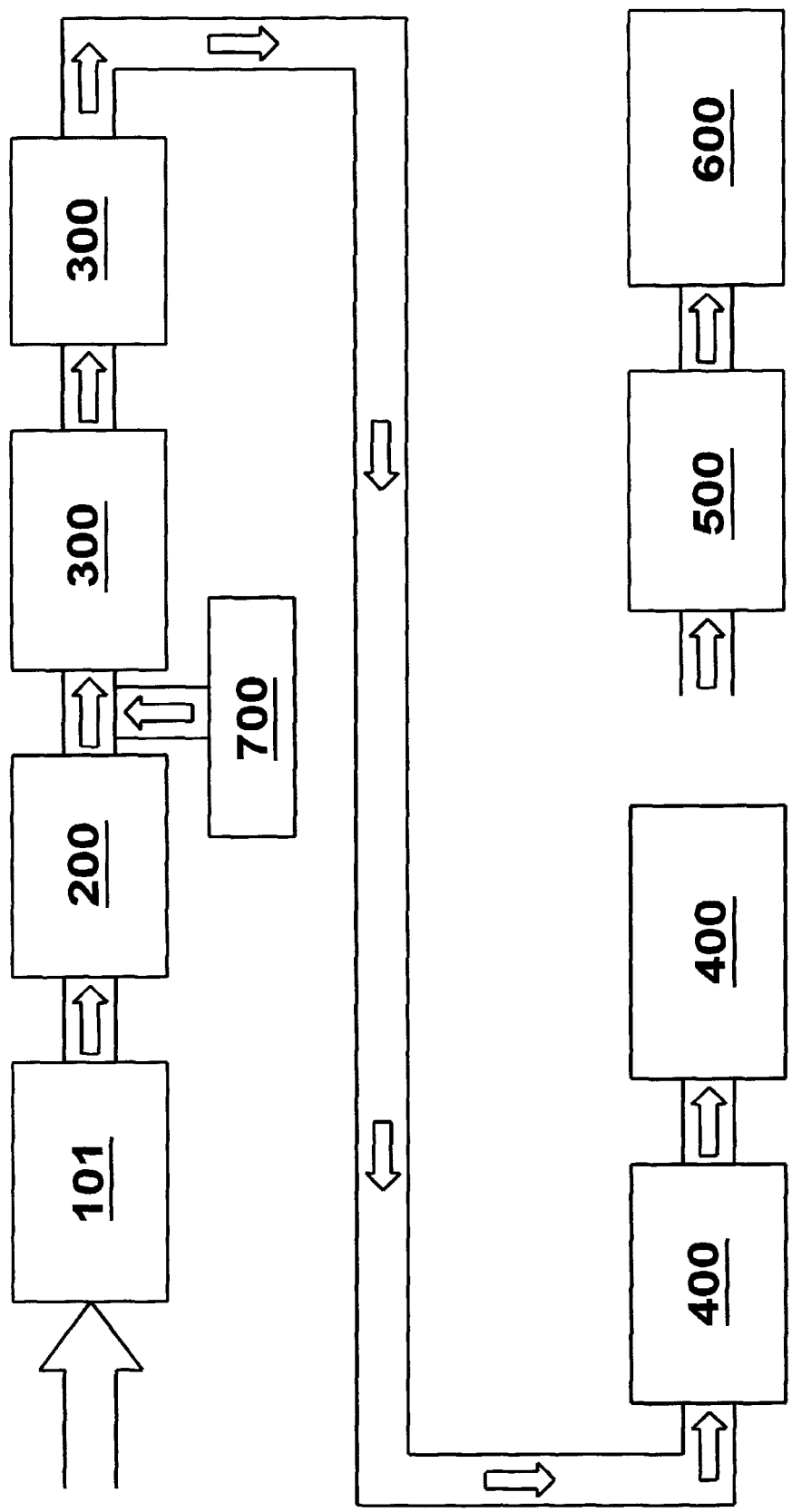
FIG. 5 is a block diagram as in FIG. 1, showing the addition of an alternative deodorizing step to Phase I of the method of the invention.

More specifically, odor control agents may be added to the waste material as it enters shredder/grinder assembly 300, as identified with reference numeral 700 in FIG. 5, so that such odor control agents are thoroughly mixed with the waste materials as they are reduced to small particles. As odor control agents are mixed with the small particles of waste produced during the shredding/grinding operation the odor reduction effect can be almost immediate, substantially eliminating the emission of foul odors from, e.g., the drying step.

Figure 6:
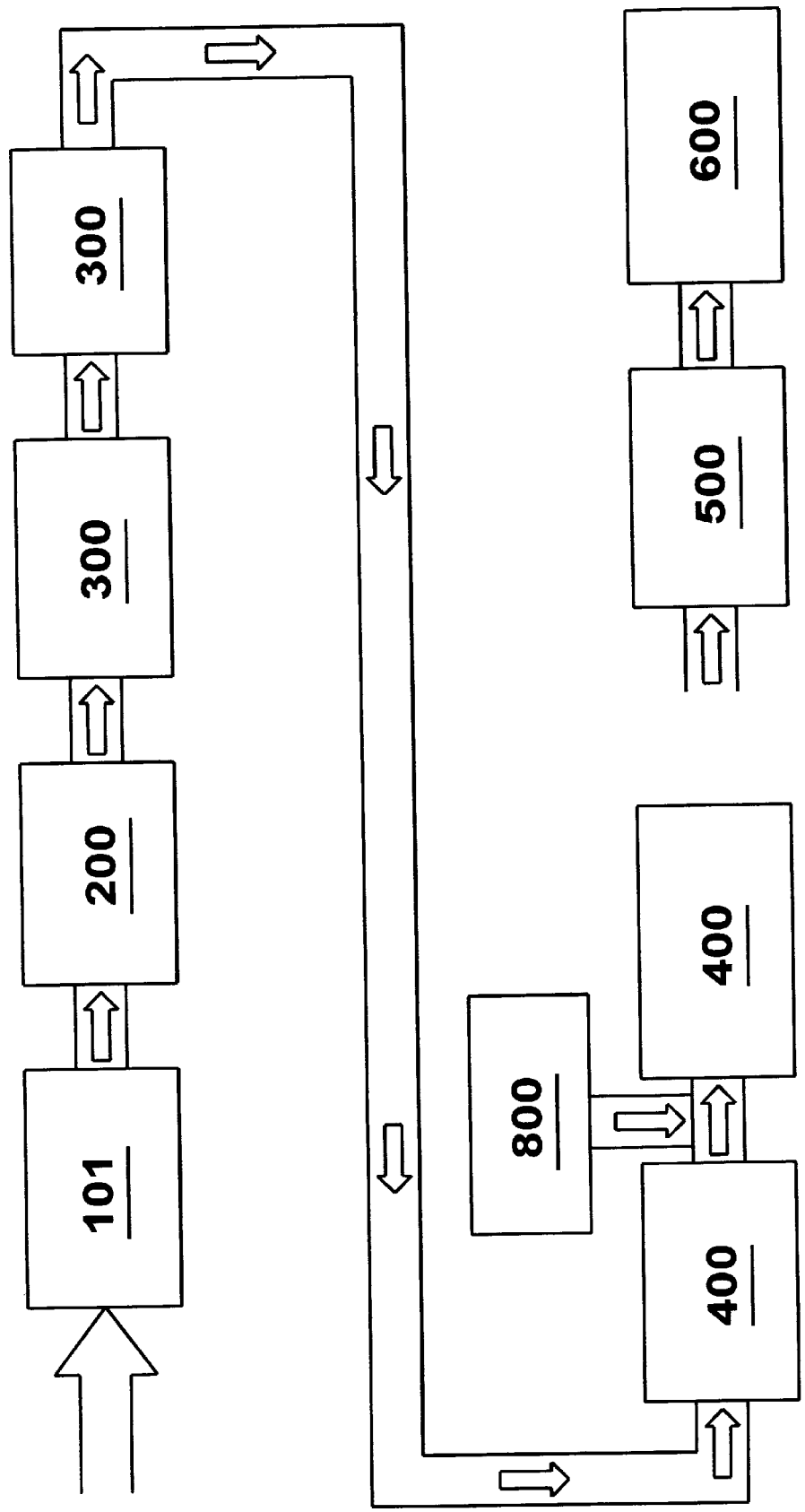
FIG. 6 is a block diagram as in FIG. 1, showing the addition of a first alternative embodiment of a sterilization step to Phase I of the method of the invention, for addition of a chemical sterilization agent.

In another alternative, chemical biocidal or sterilizing agents may be added to the waste material to assist in arresting biological activity in, and resulting degradation, of the waste material. As indicated in FIG. 6 by reference numeral 800, such agents may be added to the waste material in dryer unit 402, where the fluidization of the waste materials achieves rapid and complete mixing of the added agents with the waste material. Addition of such agents immediately before the alternative compaction and encapsulation steps provides a residual concentration of such agents to eliminate or suppress degradation during storage or transportation. Biocidal agents may also be added to the waste material in shredder/grinder assembly 300 and thoroughly mixed with the waste material during the grinding operation and before drying of the waste, either in replacement of introduction in drying unit 402 or in addition to later introduction of such agents.

Figure 7:
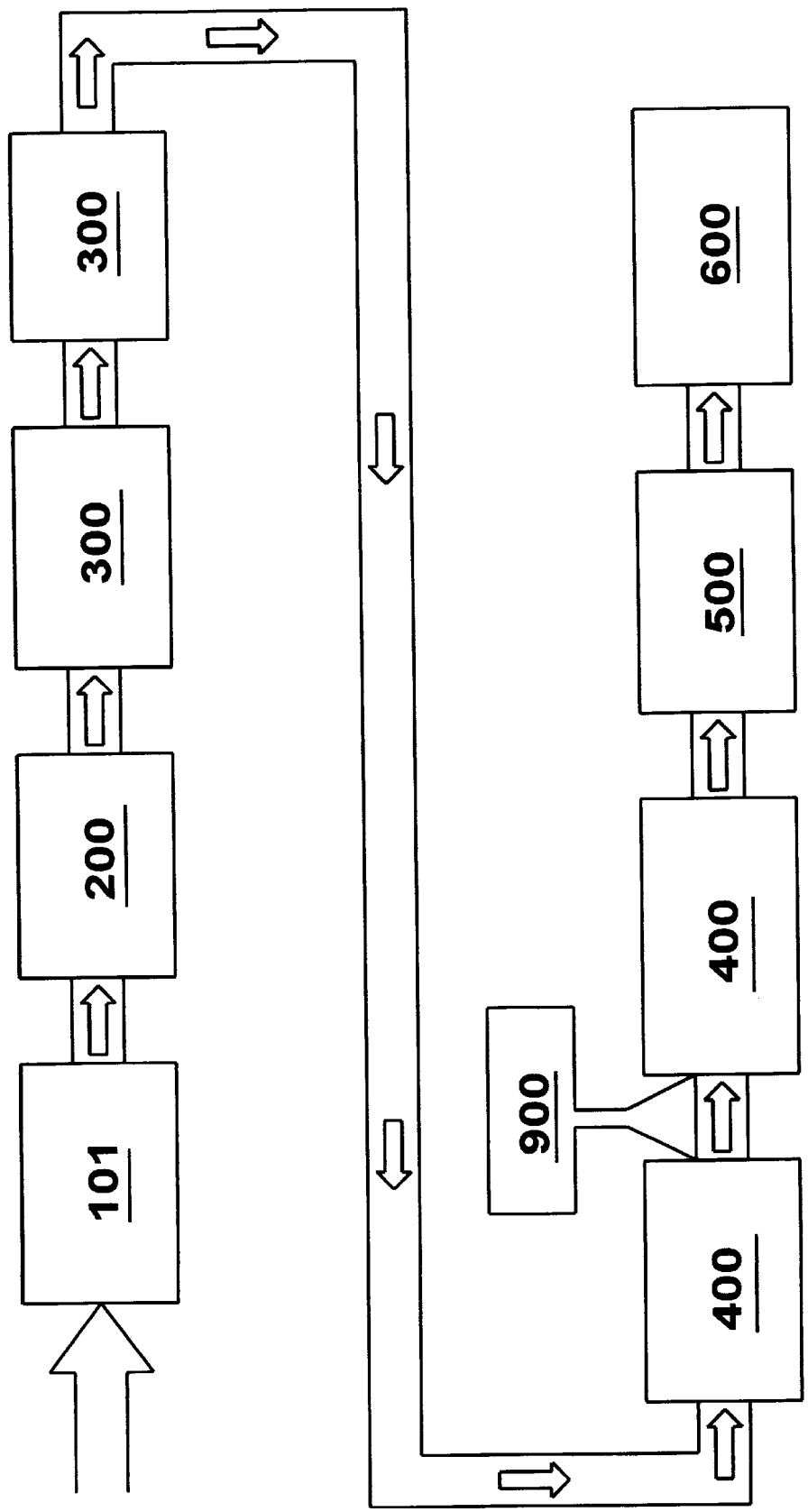
FIG. 7 is a block diagram as in FIG. 1, showing the addition of a third alternative embodiment of a sterilization step to Phase I of the method of the invention, illustrating the utilization of irradiation or microwave sterilization.

Further sterilization steps may be used in the method of the invention in addition to the heat sterilization associated with the drying steps of the preferred embodiment. For example, a sterilizing gas may be added to the drying fluid loop in, e.g., unit 403 to provide part, or even all, of the fluidization in dryer unit 402 in a closed loop flow arrangement to prevent emission of such gas from the apparatus. In a further alternative, irradiation sterilization and/or microwave sterilization may be utilized in conjunction with material transport assembly 100 as waste materials are conveyed between selected treatment apparatus assemblies. FIG. 7 illustrates the use of irradiation or microwave sterilization, indicated by reference numeral 900, between dryer units 401 and 402, with addition of a conveyor/sterilization unit 106s before bucket elevators 106. Gamma radiation is increasingly used for medical sterilization, and the utilization of gamma radiation in the method of the invention allows the method to be used to treat waste materials classified as biological hazards, such as medical tissue wastes, medical supplies, syringes, etc., effectively and safely.

Following the alternative compaction and encapsulation steps, if used, the inert blocks of treated waste material may be transported and/or stored for extended periods, for future processing and use of the materials contained in the blocks in accordance with Phase II and/or Phase III of the method of the invention. Because the waste materials have been rendered effectively inert by the processing, and because the blocks are encapsulated and the materials contained within the blocks thus isolated from the surrounding environment, long term above ground storage may be safely utilized without concern for environmental contamination. Alternatively, the blocks could be placed in excavations and covered with soil or other covering material, similar to conventional landfill operations. When it is desired to utilize the resource value of the materials forming the blocks the blocks may be readily uncovered and removed from the excavation for further processing. Even if the blocks remain stored for an extremely long duration, approaching or exceeding the projected life of conventional landfills, the probability of environmental contamination is greatly reduced and the feasibility of later resource recovery is greatly enhanced in comparison to conventional waste handling and landfill disposal.

Phase II of the method of the invention may be conceptually divided into two stages of material separation: 1) a primary separation stage, using forced air as the separation fluid, performed in a series of separator assemblies, each including a fluidized bed unit and a cyclonic separator unit, and 2) a secondary separation stage in which the primary material separation is further refined for separation and recovery of specific materials. It is contemplated that ferrous metals have been removed from the waste materials in Phase I, as described above, prior to introduction of the material stream into Phase II.

Figure 12:
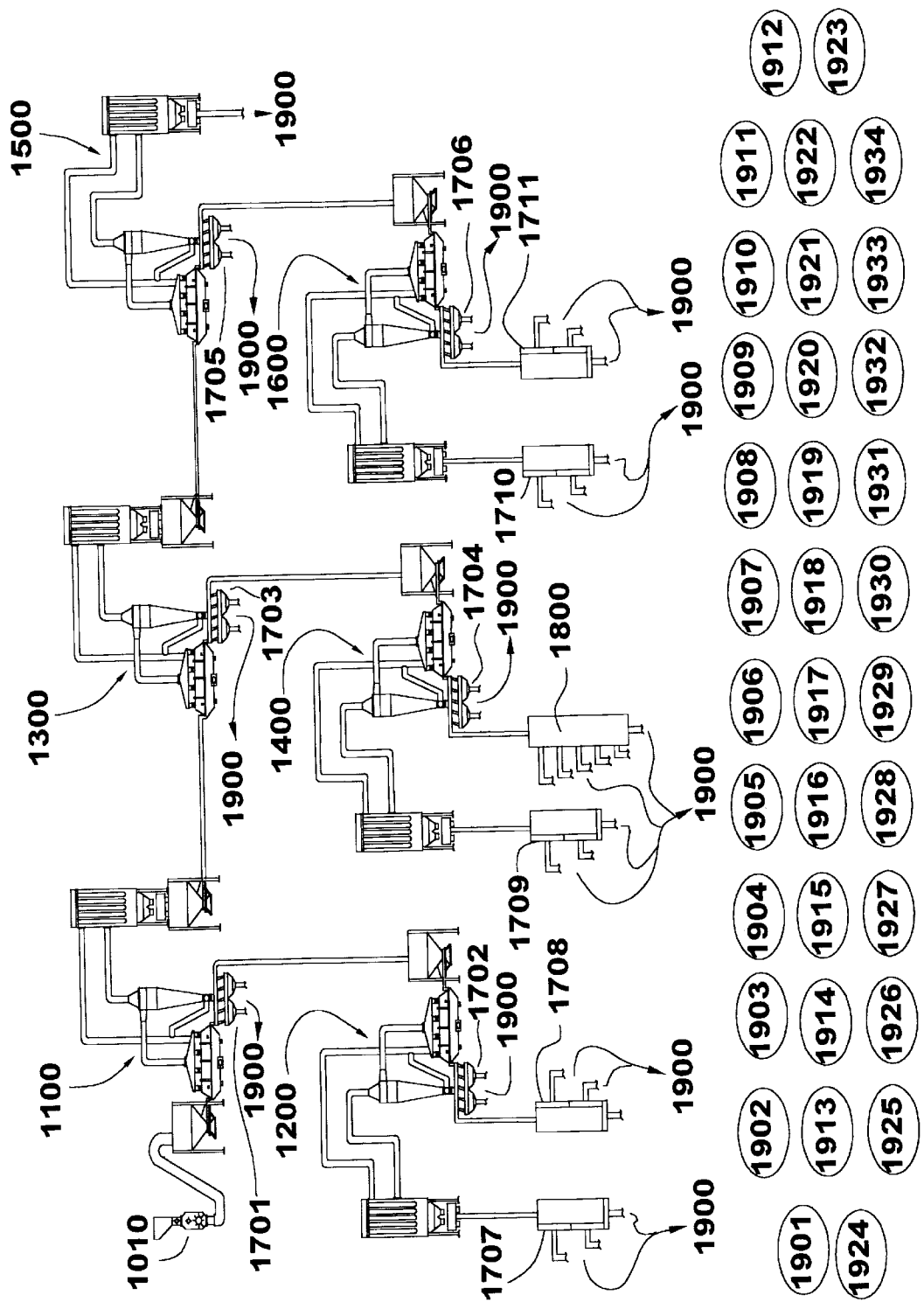
FIG. 12 is a partial schematic diagram of the preferred embodiment of the primary stage of Phase II of the method of the invention, generally illustrating apparatus used to practice the primary separation stage steps.

Solid waste materials to be processed in accordance with the preferred embodiment of Phase II of the method of the invention enter Phase II in the form of loose, dry particles of uniform dimension, prepared for such purpose in Phase I of the method. The method of the invention is used to separate materials on the basis of density, and it is important for suitably effective performance that the particles of waste material introduced for separation be essentially devoid of moisture, so that the particles may be separated on the basis of the density of the material itself without density alteration resulting from absorbed moisture. It is also important that the particles be of small size, uniform size, and uniform configuration. Each particle should be small enough in size, and thus of low enough weight, to be readily amenable to fluidization in a fluidized bed apparatus and to be amenable to entrainment in a stream of air moving a reasonable velocity consistent with the design of typical cyclonic separator apparatus. Uniformity of size is important so that all particles of a material having a certain particular density are of essentially identical mass, and separation of particles by mass effectuates separation by material density. The particles should be of uniform configuration so that each particle presents substantially the same cross-sectional area to an air stream in a fluidized bed apparatus or in a cyclonic separator apparatus. Especially when the waste materials processed in Phase I of the method have been compacted and encapsulated, and in view of the importance of proper particle preparation, the use of a grinder unit, such as the unit identified in FIG. 12 by reference numeral 1010, to break apart the compacted blocks, if used, and to ensure that the materials enter the separation steps of Phase II with the appropriate particle uniformity, is preferred, though grinder 1010 may be omitted if suitably uniform particles are conveyed directly from Phase I processing to Phase II of the processing facility.

Figure 10:
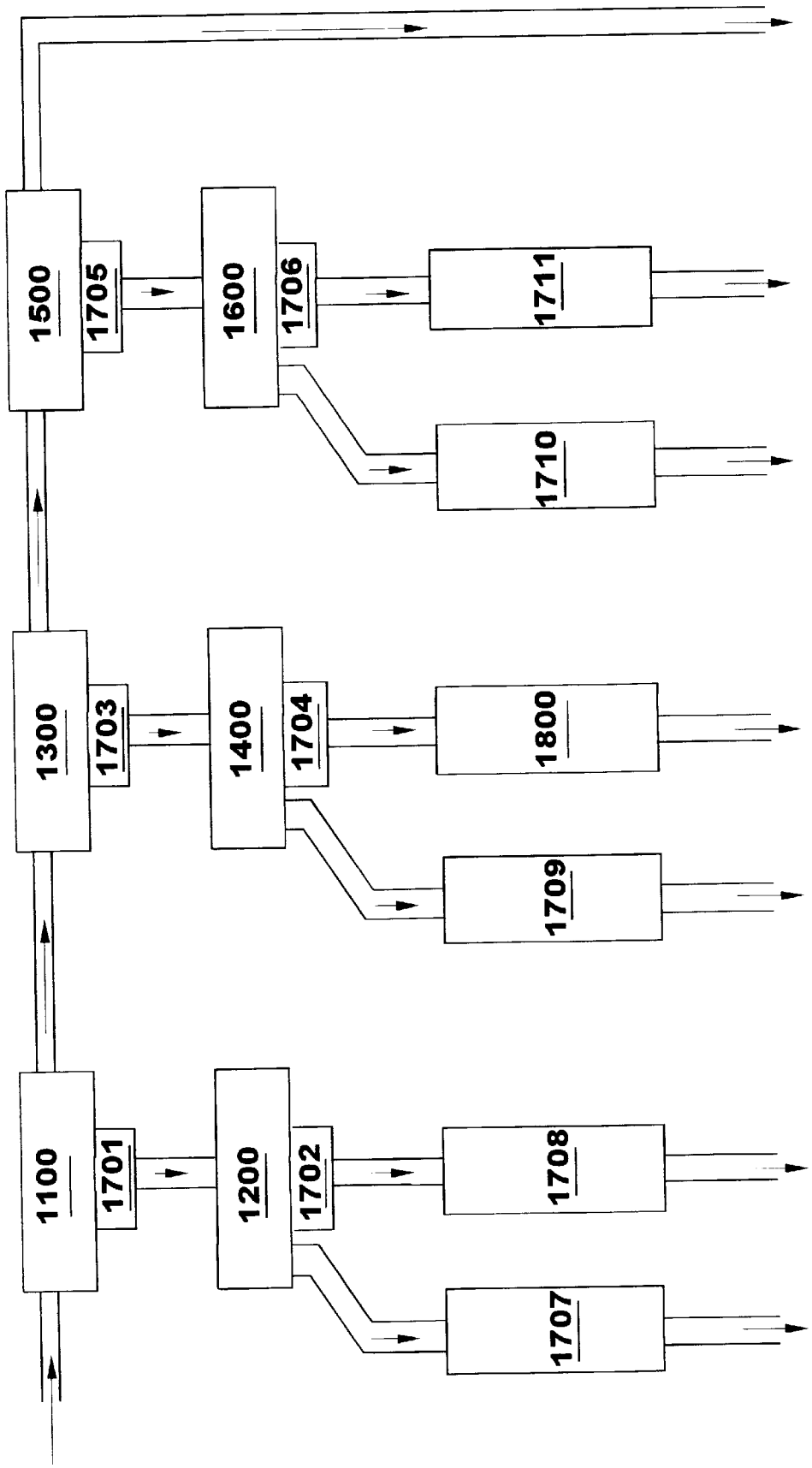
FIG. 10 is a schematic block diagram illustrating the primary and secondary separation stages of Phase II of the method of the invention.
Figure 11:
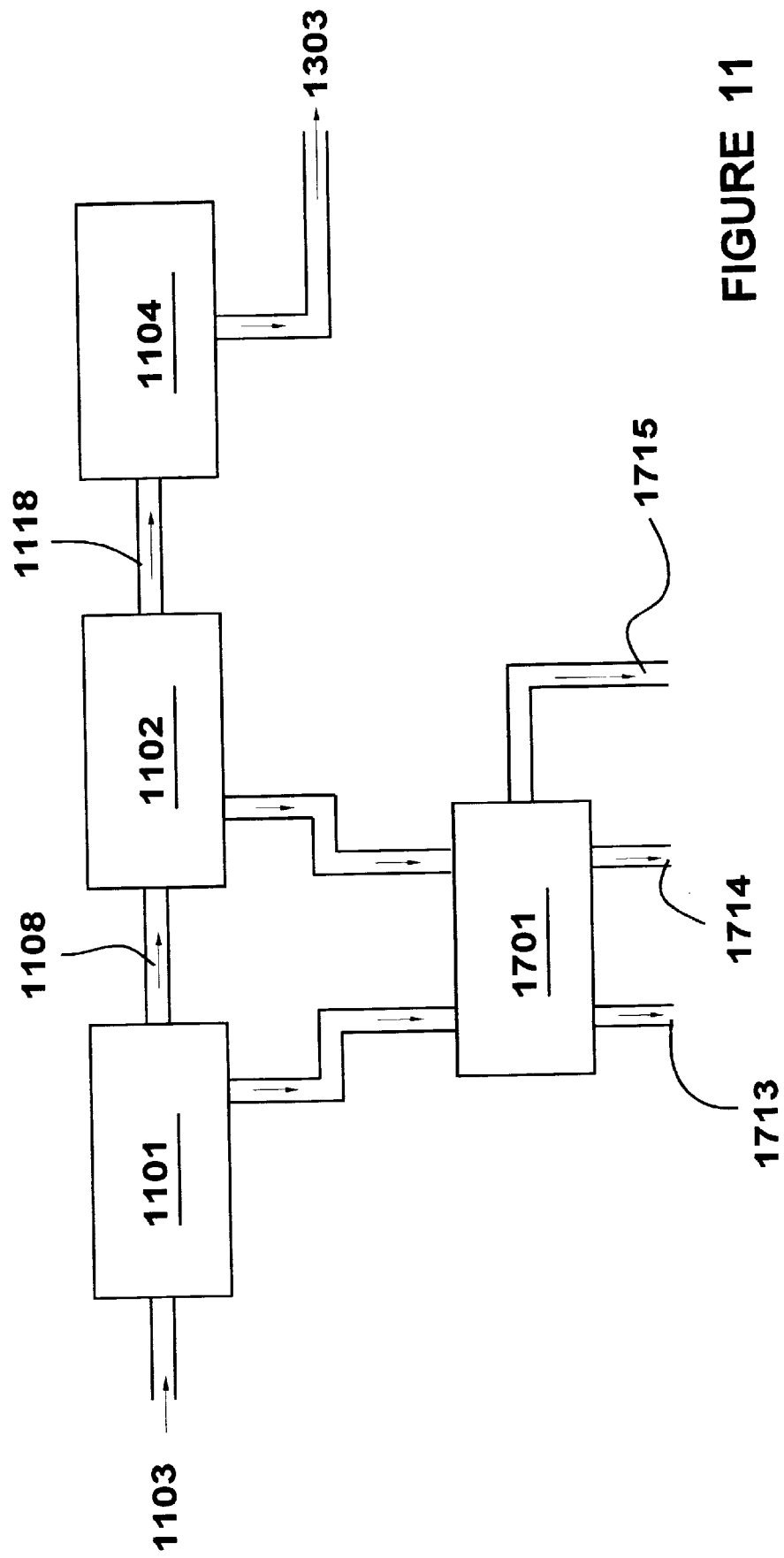
FIG. 11 is a schematic block diagram illustrating the steps of the preferred embodiment of the primary separation stage of Phase II of the method of the invention.

Referring now to FIG. 10, a block diagram illustrating the flow of material through separation processing in accordance with the method of the invention, waste materials enter the Phase II processing in a single stream comprising a heterogenous mixture of all waste components. The waste materials are initially passed through a primary processing stage in which air flow is utilized for separation of the materials on the basis of density. The primary processing stage includes a plurality of air flow separator assemblies, each preferably comprising a fluidized bed unit and a cyclonic separator unit. In the first separator assembly, generally designated by reference numeral 1100, the single incoming material stream is separated into three streams, a heavy stream including materials with densities below a preselected value, a light stream including materials with densities above a second preselected value, and an intermediate stream including materials with densities between the first and second values.

Following second stage processing on a vibratory conveyor, as described below, the remaining materials in the heavy and intermediate streams from the first separator assembly 1100 are combined and routed to a second separator assembly 1200. In the second separator assembly, which also includes a fluidized bed unit and a cyclonic separator unit, the entering waste materials are further separated into three streams by density; a heavy stream, a light stream, and an intermediate stream. Following second stage processing on a vibratory conveyor, the materials from the heavy and intermediate streams of the second separator assembly are routed to further secondary stage processing, or may be routed directly to Phase III or to storage. The light stream from the second separator assembly is also routed to secondary stage processing, to Phase III, or to storage.

The light stream of materials leaving the first separator assembly is fed to a third separator assembly 1300, again preferably including a fluidized bed unit and a cyclonic separator unit, where the single steam of incoming materials is separated into a heavy stream, a light stream, and an intermediate stream. As with the heavy and intermediate streams from the first separator assembly, the heavy and intermediate streams from the third separator assembly may be subjected to second stage separation processing and recombined to enter a fourth separator assembly 1400. The light stream of materials from the third separator assembly is fed to a fifth separator assembly 1500. In the fourth separator assembly the materials are separated into three steams which may be further processed or sent to Phase III or storage, similar to the treatment of the materials exiting the second separator assembly.

The light stream of materials from the third separator assembly is further separated in the fifth separator assembly 1500 into three streams. The light stream from the fifth separator assembly is routed to immediate use or storage, either directly or through a second stage separation unit. The heavy and intermediate streams from the third separator assembly are subjected to second stage separation, recombined, and fed to a sixth separator assembly 1600. As in the previous assemblies, the single entry stream is divided into three streams of different densities, and each stream is routed through second stage separation or directly use or interim storage.

Figure 13:
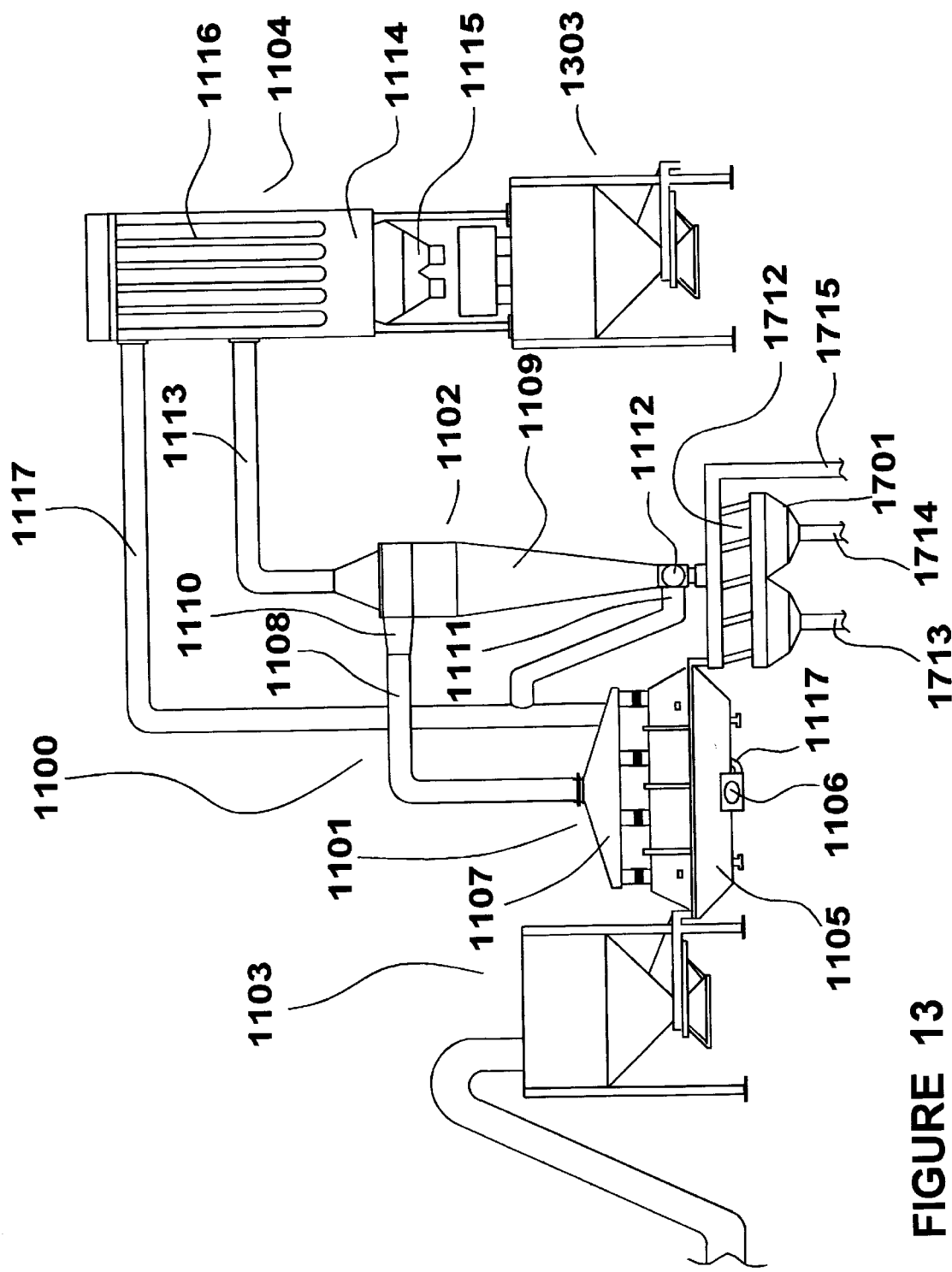
FIG. 13 is an illustration of a separator assembly suitable for use in practicing Phase II of the method of the invention.

Each of the primary stage separator assemblies 1100 through 1600 is of the same general design, and includes a fluidized bed unit and a cyclonic separator unit. Referring to FIG. 13, illustrating separator assembly 1100, the fluidized bed unit is designated by reference numeral 1101 and the cyclonic separator unit is designed by numeral 1102. Separator assembly 1100 also includes material feed hopper 1103 and transition unit 1104 as major components. Fluidized bed unit 1101 includes bed container 1105, air inlet 1106, collection hood 1107, and material conduit 1108. Cyclonic separator 1102 includes body 1109, material inlet 1110, air inlet 1111, air lock 1112, and material conduit 1113. Transition unit 1104 includes chamber 1114, material outlet 1115, filters 1116, and air return line 1117.

Material entering separator assembly 1100 is deposited in feed hopper 1103 from which it is continuously fed into bed container 1105 of fluidized bed unit 1101. Air is forced into bed container 1105 through air inlet 1106 and is distributed within bed container 1105 to flow upward through the bed of materials therein. As the air flows through the bed of materials the particles are lifted and lighter particles of waste material are entrained in the air stream and carried into collection hood 1107 and on into material conduit 1108, connected between fluidized bed unit 1101 and cyclonic separator unit 1102. Heavier materials confined in bed container 1105 are not entrained in the air flowing through the bed and are dropped from the fluidized bed to exit from bed container 1105.

Lighter materials carried in the air stream through conduit 1108 enter cyclonic separator 1102 through material inlet 1110, and encounter a stream of air flowing through body 1109 from air inlet 1111. From the materials entering cyclonic separator 1102, lighter materials are entrained in the cyclonic air stream and are carried from body 1109 through conduit 1113. Materials too heavy to be entrained in the air stream fall to the bottom of body 1109 and are removed through air lock 1112.

Air and entrained particles of the waste materials flow through conduit 1113 into chamber 1114 of transition unit 1104. Chamber 1114 is of sufficiently large dimension that the air entering chamber 1114 loses velocity, allowing the entrained particles to drop out of the air flow to the bottom of the chamber and exit transition unit 1104 through material outlet 1115. The exiting materials fall into hopper 1303 of separator assembly 1300. The air exits chamber 1114 through filters 1116, which remove dust and other fines from the air, and is conducted through air return line 1117 to fluidized bed unit 1101 in a closed loop.

Additional separator assemblies 1200 through 1600 are essentially identical in design to separator assembly 1100, and the description of the components of separator assembly 1100, identified by "1100 series" reference numbers, is equally applicable to the components of separator assemblies 1200 through 1600. In addition to achieving effective separation of materials, the fluidized beds and cyclonic separators perform an effective cleaning function. It is generally necessary for recovered materials intended for recycling or reuse as in Phase III of the method to be thoroughly cleaned after separation and recovery, and the prior art approaches use substantial volumes of water for cleaning. Within the Phase II processing of the method of the invention the particles are suspended in and agitated by the air flow in both the fluidized bed units and, especially, in the cyclonic separator units, and that agitation results in repetitive collisions of particles with each other and with the unit structures. As a result of those collisions the particles are abraded and the particles surfaces are thoroughly cleaned during the movement of the particles through the apparatus. The dust and other fine contaminant particles produced from the cleaning are removed from the air stream by filters 1116.

Figure 15:
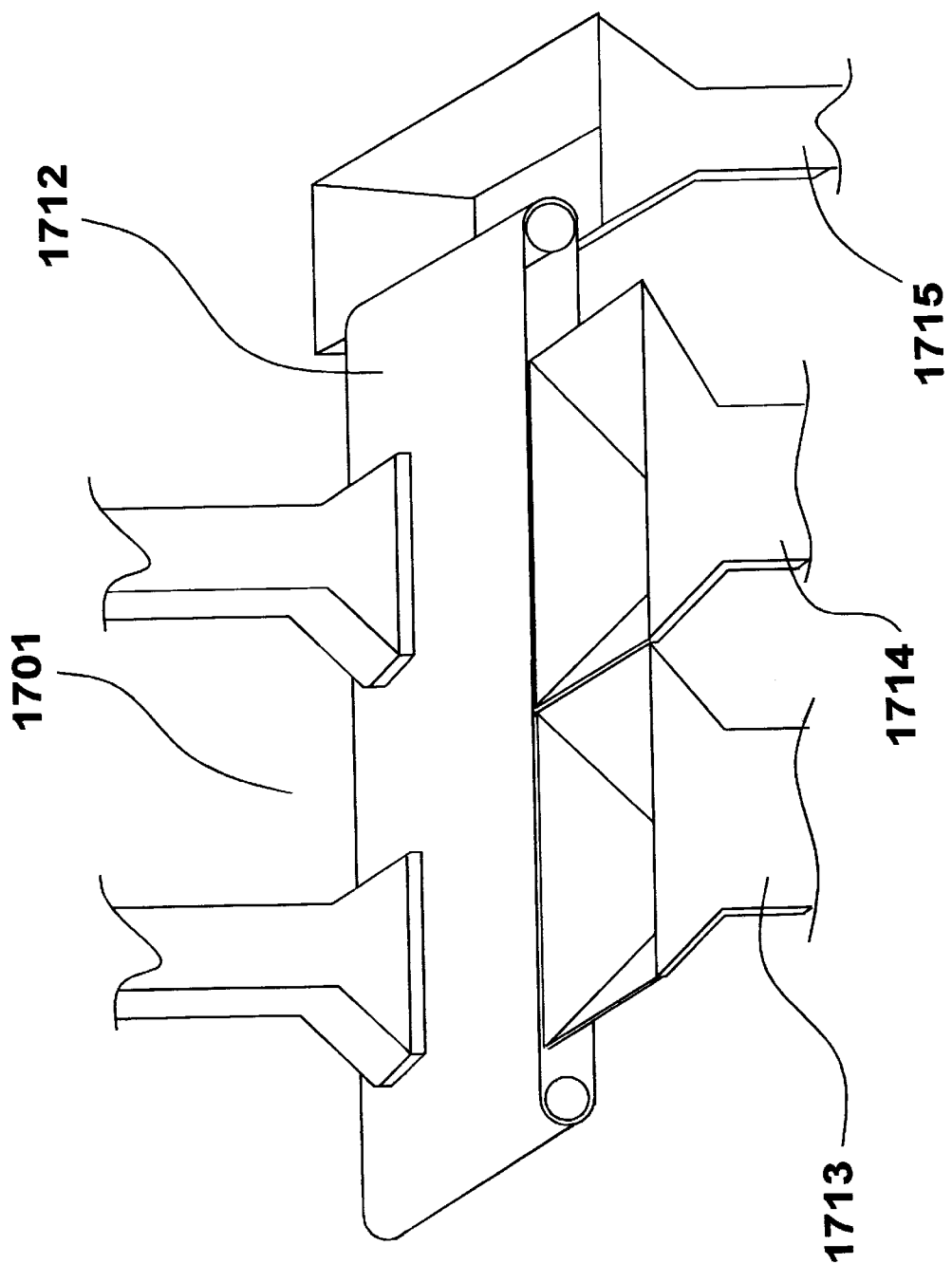
FIG. 15 is a schematic illustration of a vibratory conveyor separator suitable for use in practicing Phase II of the method of the invention.

In the preferred embodiment of the invention the waste material that is not entrained in the air flow in the separator assemblies, such as assembly 1100, forming the streams of heavier materials from fluidized bed unit 1101 and cyclonic separator unit 1102, are subjected to second stage processing before being introduced to a subsequent primary stage separator assembly, or to use or interim storage from the final primary stage separator assembly in the material flow path described above. In the preferred embodiment the initial second stage processing utilizes vibratory conveyors, such as the conveyor assembly generally designated by reference numeral 1701 in FIG. 13. As illustrated in FIG. 15, the heavier material stream from fluidized bed unit 1101 is placed on an inclined vibrating belt 1712 at the beginning of the belt path. More dense material particles move across the incline, and fall from the belt, more rapidly than less dense materials, so the exit location along the length of the belt path is proportional to density. Materials removed from cyclonic separator 1102 through air lock 1112 are lower in density than the materials placed on the belt from fluidized bed 1101 and are placed on belt 1712 farther along the belt path, at a location where the densities of those materials generally matches the densities of the materials remaining on the belt at the entry location. The materials falling from the edge of the belt are collected in density zones and routed to storage through, e.g., conduits 1713 and 1714. Materials of sufficiently low density to remain on the belt through the full belt path are routed to the next sequential primary stage separator assembly through conduit 1715 of FIG. 13, or to Phase III or interim storage from the final assembly in the sequence.

Streams of separated material exiting from the primary stage separation assemblies may also be subjected to further second stage separation processing in addition to the vibratory conveyor secondary separation between assemblies. Further vibratory belt separation units, illustrated as units 1702 through 1711 in FIG. 12, may be used as described above to further refine the density separation of the materials before subsequent use of the materials, or other separation techniques may be utilized. Each of vibratory separation units 1702 through 1711 includes the same general components described above for unit 1701.

Figure 14:
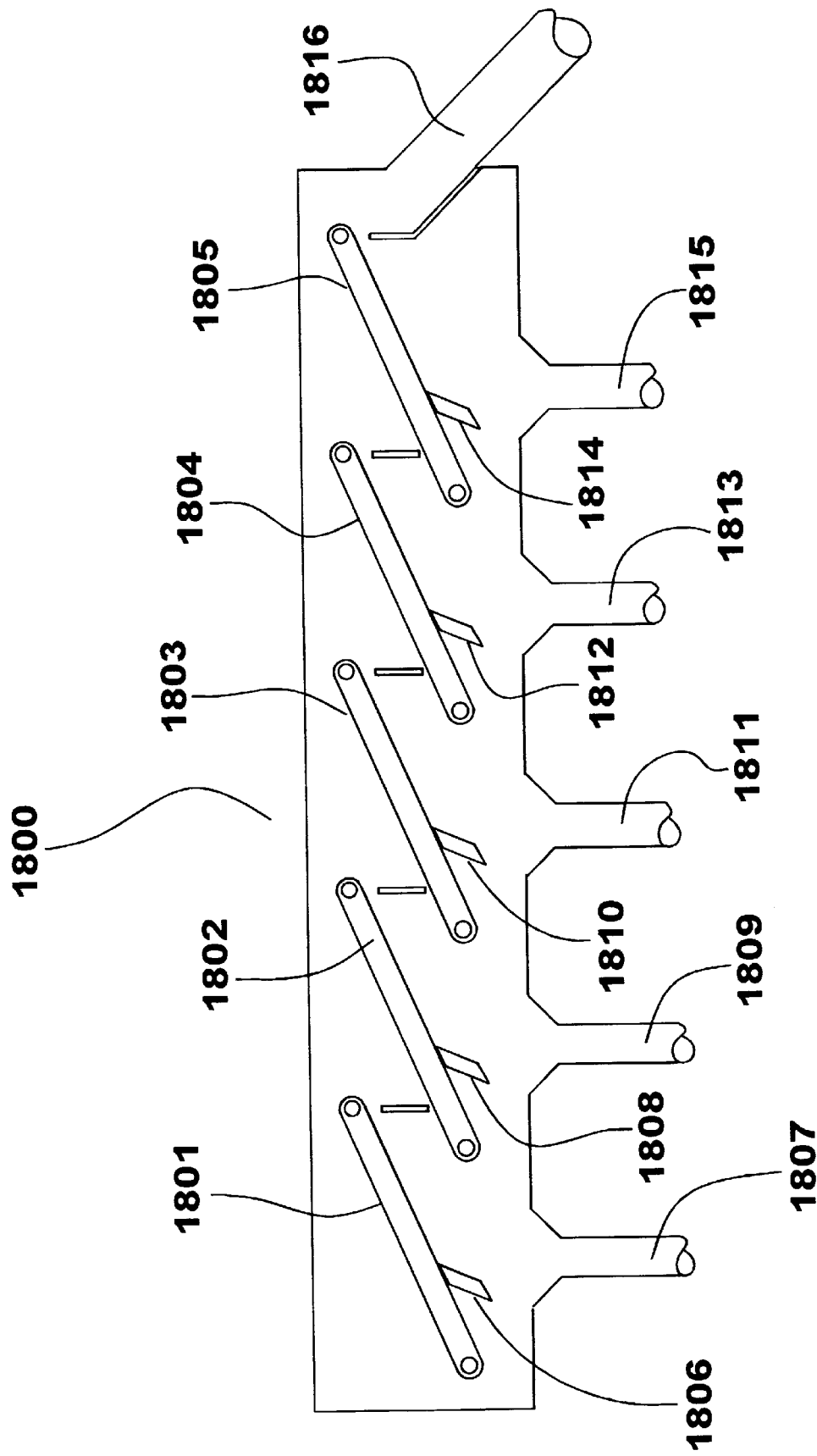
FIG. 14 is a schematic illustration of a melt separation step of Phase II of the method of the invention.

In one embodiment of the method of the invention second stage physical separation in the form of "melt separation" is used to further separate plastic materials of differing chemical composition, based upon melting point. As schematically illustrated in FIG. 14, a melt separation unit, generally designated by reference numeral 1800, comprises a series of heated belts 1801 through 1805. Each such belt is heated on its upper surface to a specific temperature selected to match the melting point of a particular plastic type, such as polyvinyl chloride, high density polyethylene, etc. Belt 1801 is heated to the lowest temperature, belt 1805 is heated to the highest temperature, and the intermediate belts heated to sequentially increasing intermediate temperatures. In general, different types of plastics, though they may have very similar densities, have different melting temperatures, so one particular plastic type will melt at the temperature at which each belt is maintained, but will not melt at lower temperatures. A stream of particles of mixed plastics or including mixed plastics is conveyed to unit 1800 and placed on moving belt 1801 in a single layer so that each particle is in contact with the belt surface. As the materials are carried by belt 1801 the particles of plastic with a melting point at the temperature of belt 1801 begin to melt and adhere to the surface of the belt. When the belt moves over its upper roller all non-adhered materials fall from belt 1801 to belt 1802, while the adhered particles remain on belt 1801 as it begins the return portion of the continuous loop path followed by each segment of the belt. The belt surface is allowed to cool slightly after passing over the upper roller, to a temperature below the melting point of the adhered plastic, allowing the particles to re-solidify. The particles are removed from belt 1801 by scraper 1806 and exit the unit through conduit 1807. The same sequence of surface melting, adhesion, cooling, and removal of particles of particular plastic types is repeated on each of the subsequent belt assemblies, with the separated plastics exiting unit 1800 through conduits 1809, 1811, 1813, and 1815 in addition to 1807. Remaining materials exit the separation unit through conduit 1816. Since the particles of material processed in accordance with the method of the invention have been thoroughly cleaned in the primary stage separation assemblies, the plastic particles exiting melt separation unit 1800 are clean and each plastic material stream is free of contaminating materials. The plastic materials may thus be used without further cleaning, and the cost and pollution concerns associated with washing and other cleaning techniques are eliminated.

Separated materials from the primary and secondary separation stages are routed to storage in silos, or other appropriate storage units, designated generally with reference numeral 1900, and individually illustrated with numerals 1901 through 1934, for subsequent use or sale. It should be noted that the number of storage units illustrated is not intended to be limiting, and the actual number used in practice will be determined by the scope of separation and the number of materials a user of the method desires to separately store. It is preferred that the storage units be provided between Phase II and Phase III of the method, in order to facilitate the balancing of flows of material. As described below, Phase III of the method of the invention is flexible in design and operation to accommodate production of a variety of final products from the recovered and separated materials, and it is contemplated that the quantity of the various materials utilized may be variable over time. The storage units provide the capacity to accommodate the relatively regular flow of materials from Phase I and Phase II of the method with the potentially less regular flow of any given material through Phase III.

Figure 16:
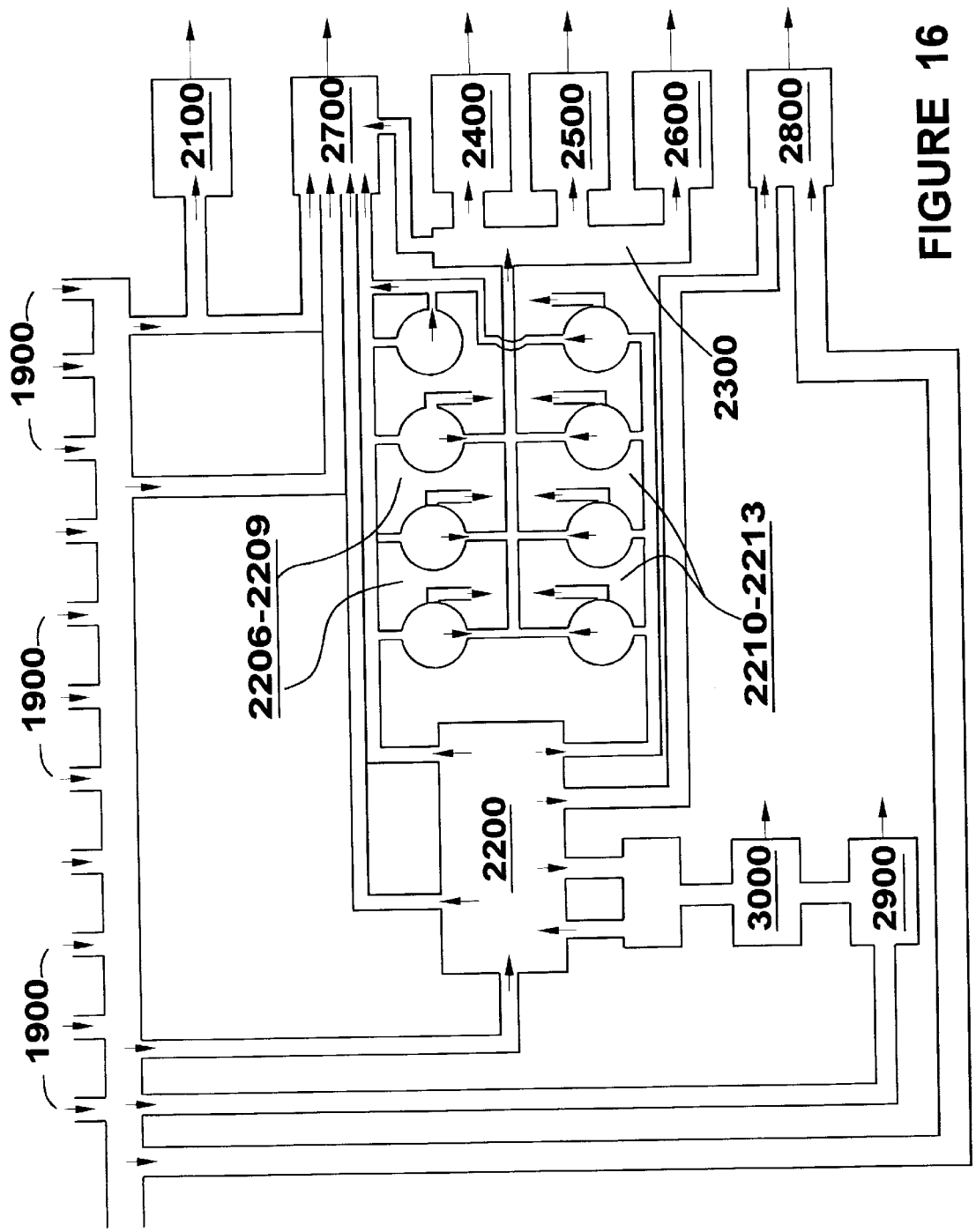
FIG. 16 is a schematic block diagram illustrating the steps and typical component configuration of the preferred embodiment of Phase III of the method of the invention.

In the preferred embodiment of the method, Phase III, schematically illustrated in FIG. 16, includes both interrelated and discrete sub-phases selected to utilize the resource value of the materials treated and separated in Phases I and II of the method. The principal sub-phases include an aluminum extrusion sub-phase, designated by reference numeral 2100, a plastics refining sub-phase 2200, a plastics polymerizing/pelletizing sub-phase 2300, a plastic injection molding sub-phase 2400, a plastics blow molding sub-phase 2500, a plastics extrusion sub-phase 2600, a composite extrusion sub-phase 2700, a fuel material sub-phase 2800, and a composting sub-phase 2900. An incinerator/power plant unit 3000 to convert waste materials to steam for process heating and/or generation of electricity is also associated with Phase III.

In the aluminum extrusion sub-phase 2100 aluminum materials separated in Phase II are routed to a sub-phase unit where the aluminum is heated to a sufficient temperature to become fluid, and is forced through a conventional aluminum extrusion die or dies to produce aluminum products for, e.g. the construction industry. It will be understood by those of reasonable skill in the pertinent art that the recovered aluminum materials may be alloyed with other recovered materials from Phase II of the method, or with materials obtained from sources outside the method, and that conventional metal extrusion techniques may be effectively used to produce the final products from sub-phase 2100. The inclusion of sub-phase 2100 in the method of the invention allows the production of useful aluminum products with commercial value without the disadvantages associated with intermediate sale and transportation of the recovered aluminum waste to a separate facility. The aluminum materials routed to and used in sub-phase 2100 may include aluminum cans, or cans may be removed from the waste stream prior to the Phase I treatment steps, at the discretion of the user.

The plastics refining sub-phase 2200 of the method provides a means of achieving complete and controlled separation of plastic materials with a very high degree of accuracy and reliability. The separation techniques of sub-phase 2200 are based upon the solubility of the plastic materials in various solvents, under controlled temperature and pressure conditions. After each targeted material is dissolved, effecting a depolymerization of the plastic to the respective monomeric resin, the solvent/resin solution is filtered to remove impurities and additives such as catalysts, colorants, antioxidants, and fire retardants, the solvent is recovered, and the liquid resin is conveyed to storage for subsequent use or sale. Because different plastic families, and even different compositions within a basic family, have different solubilities in a given solvent, solvent extraction can be effectively utilized to sequentially remove a particular component from a heterogenous mixture. Methylene chloride has been found to be an effective solvent for most plastic materials when used under appropriate temperature conditions, and it has also been found that the ability of that solvent to dissolve different plastic materials may be controlled by controlling the temperature and pressure of the reaction.

Figure 17:
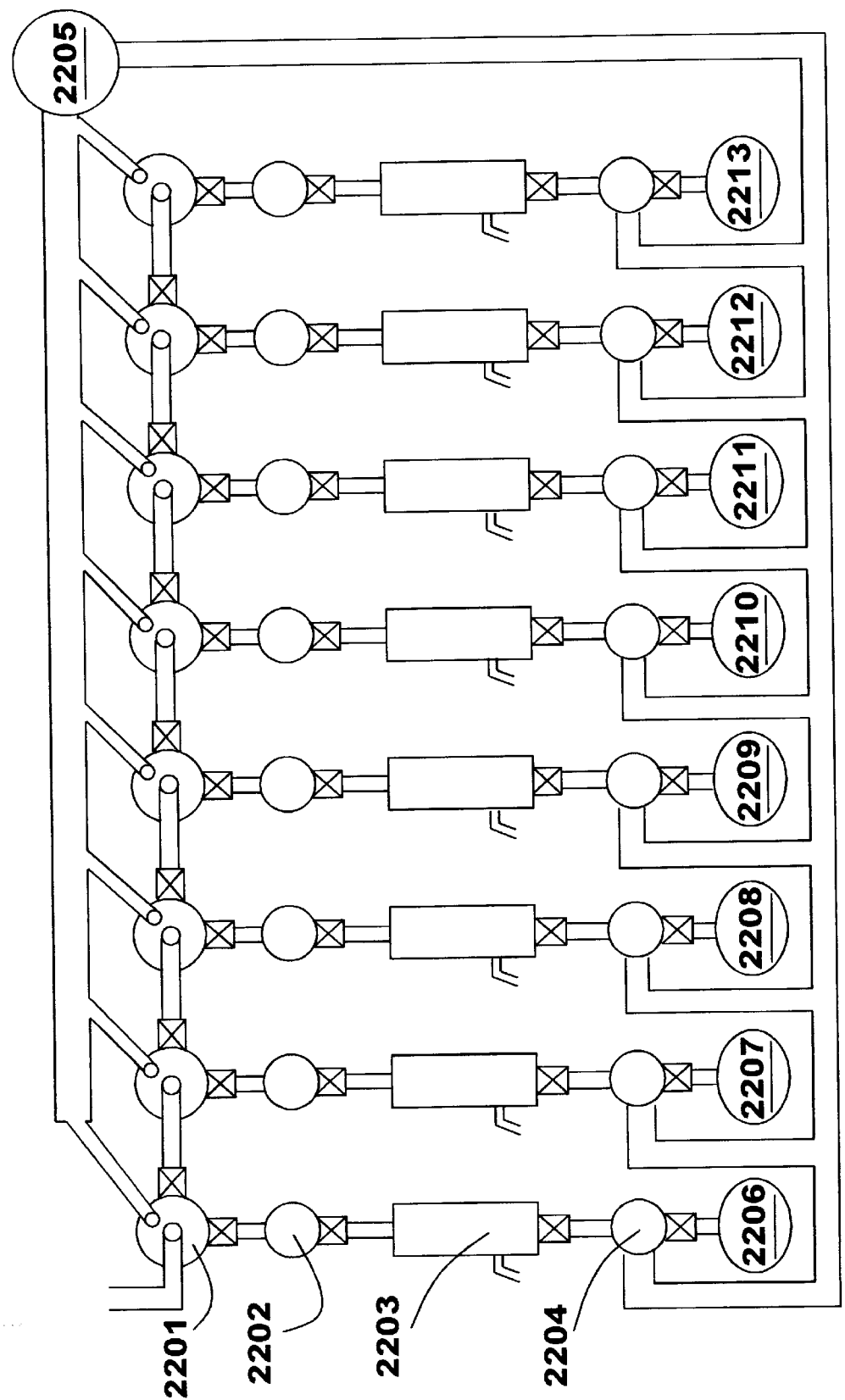
FIG. 17 is a schematic block diagram illustrating the steps of the solvent separation unit of the preferred embodiment of Phase III of the method of the invention.

FIG. 17 schematically illustrates a typical embodiment of a facility for practicing the plastics refining steps of the method of the invention. The refining takes place in a series of processing lines which are essentially identical in construction and layout, so only one of the eight processing lines illustrated will be described, and it will be understood that the description is applicable to the remaining processing lines utilized in the facility. It should also be noted that while eight processing lines are illustrated in the drawings, the actual number of processing lines will be determined for each installation. Referring to FIG. 17, the mixture of plastic materials to be refined is introduced initially to a solvent extraction reactor vessel 2201, and methylene chloride or other selected solvent is added to the reactor vessel and brought into close contact with the plastic mix. The temperature and pressure of the reactor vessel is controlled to selected values, determined by the composition of the plastic to be dissolved in the reactor vessel and the characteristics of the solvent used. The solution of one particular plastic resin and solvent is drawn from the reactor vessel and conveyed to a holding tank 2202. The undissolved plastic materials are drawn from the reactor vessel and conveyed to the reactor vessel of the next processing line. The solution in holding tank 2202 is conveyed to a filtration unit 2203, where impurities and additives are removed by entrapment in a series of filter elements. The filtered, and thus purified, solution is conveyed to solvent recovery unit 2204, where the great majority of the solvent is removed by, e.g., vacuum distillation. The recovered solvent is conveyed to a central solvent tank 2205, and the recovered and refined resin is conveyed to a holding tank or storage unit 2206. Other storage units are designated by reference numerals 2207 through 2213 in the illustration.

Figure 18:
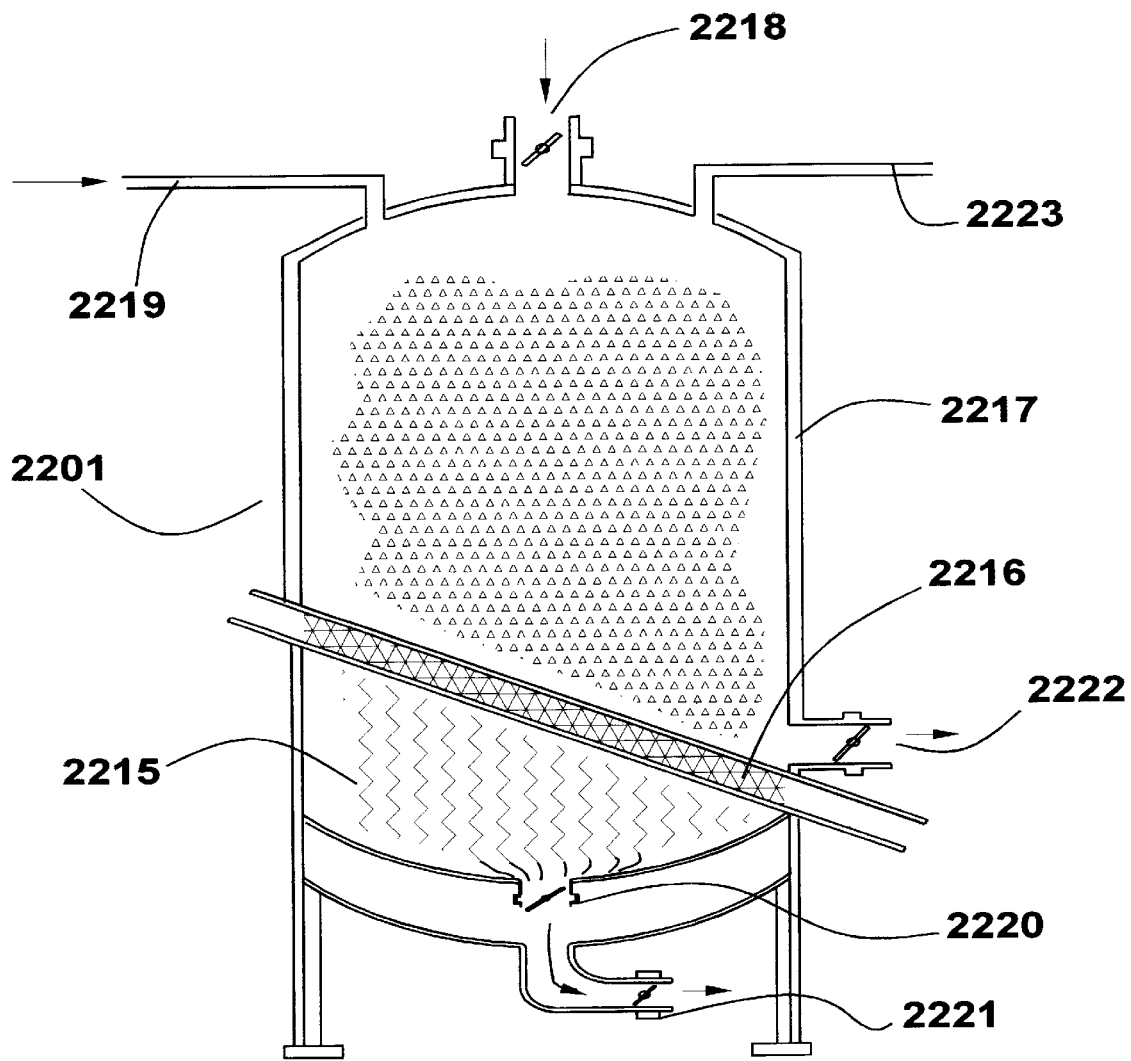
FIG. 18 is a schematic illustration of the preferred embodiment of a solvent extraction reactor vessel for use in practicing the solvent separation step of Phase III of the method of the invention.

Although a variety of solvent extraction vessel designs may be used in the practice of the method of the invention, a preferred embodiment of a reactor vessel is generally illustrated in FIG. 18. The reactor vessel 2201 is laterally divided into an upper section 2214 and a lower section 2215, with a filter screen 2216 disposed between them. The sections are preferably connected by bolt flanges, allowing them to be readily disconnected for replacement of the filter 20 screen. For temperature control, the upper section of the reactor vessel is surrounded by a steam jacket 2217. The incoming plastic material mixture is introduced to the reactor vessel through inlet line 2218, and the solvent is introduced through solvent line 2219. As the targeted plastic is dissolved in the solvent, the solution passes through the filter screen into the lower section 2215, and into a withdrawal sump through valved passageway 2220. The solution may then be drawn from the reactor vessel through solution outlet line 2221, also supplied with a valve, and routed to holding tank 2202. The undissolved plastic materials, which may have assumed a slurry or sludge-like consistency in the reactor vessel, are withdrawn through valved plastic residue outlet line 2222 and conveyed to the solvent extraction reactor vessel of the next processing line. The preferred inclined placement of the filter screen in the reactor vessel aids in removal of the undissolved materials and facilitates the operation of each processing line on a continuous rather than batch processing basis. A pressure control line 2223 is connected to reactor vessel 2201 for the purpose of controlling the pressure within the reactor vessel, thereby allowing the boiling point of the solvent to be controlled. With a solvent such as methylene chloride, the solvent activity is variable with temperature, and the susceptibility of the plastic material to dissolution is also variable with temperature. Precise control of the solubility dynamics of the processing may thus be achieved by controlling the temperature at which the solvent reacts with the plastic materials in the reactor vessel. In order to achieve effective temperature control over a broad range, the application of pressure or vacuum to the reactor vessel allows the operator to raise or lower the boiling point of the solvent so that the desired reaction temperature may be achieved without solvent boiling.

The polymerizing/pelletizing sub-phase 2300 of the method of the invention provides one of the several product production outlets for plastic materials recovered and refined in sub-phase 2200 of the method, and allows a user of the method to produce plastic pellets with a chemical purity approaching that of virgin materials, for direct sale or as a feed material to a subsequent product production sub-phase. The monomeric resins segregated and refined in sub-phase 2200 are drawn from intermediate storage and polymerized, extruded, and pelletized in accordance with conventional techniques well known to and understood by those of reasonable skill in the pertinent art.

In the injection molding sub-phase 2400, plastic pellets of any suitable plastics family from the polymerization/pelletizing unit 2300 are used to produce final products through conventional injection molding techniques. The high purity and direct availability of pelletized recovered plastics allows a user of the method of the invention to produce a wide variety of commercial injection molded products of high quality and economic value. The same advantages of readily available, high quality, and low cost raw materials may be achieved in the production of products using conventional blow molding techniques in sub-phase 2500 of the method, as well as conventional extrusion techniques in extrusion sub-phase 2600.

In addition to the production of commercial products by conventional molding and extrusion techniques, the method of the invention provides a means of producing an advanced composite material at very low cost, utilizing waste constituent materials previously viewed as having no value or even negative value (i.e., disposal cost). In composite extrusion sub-phase 2700, particles of waste material of almost any composition are mixed with a minimal quantity of plastic resin binder, catalyzed, and pumped into the interior of a hollow extruded plastic body, whereupon the binder polymerizes to form a rigid core within the body or outer layer. The resulting composite material is highly useful and very well suited as a low cost wood replacement product with an extremely wide range of uses. The composite material is produced in a composite extrusion process in which the body, or outer layer, and the core are formed simultaneously and continuously.

Figure 19:
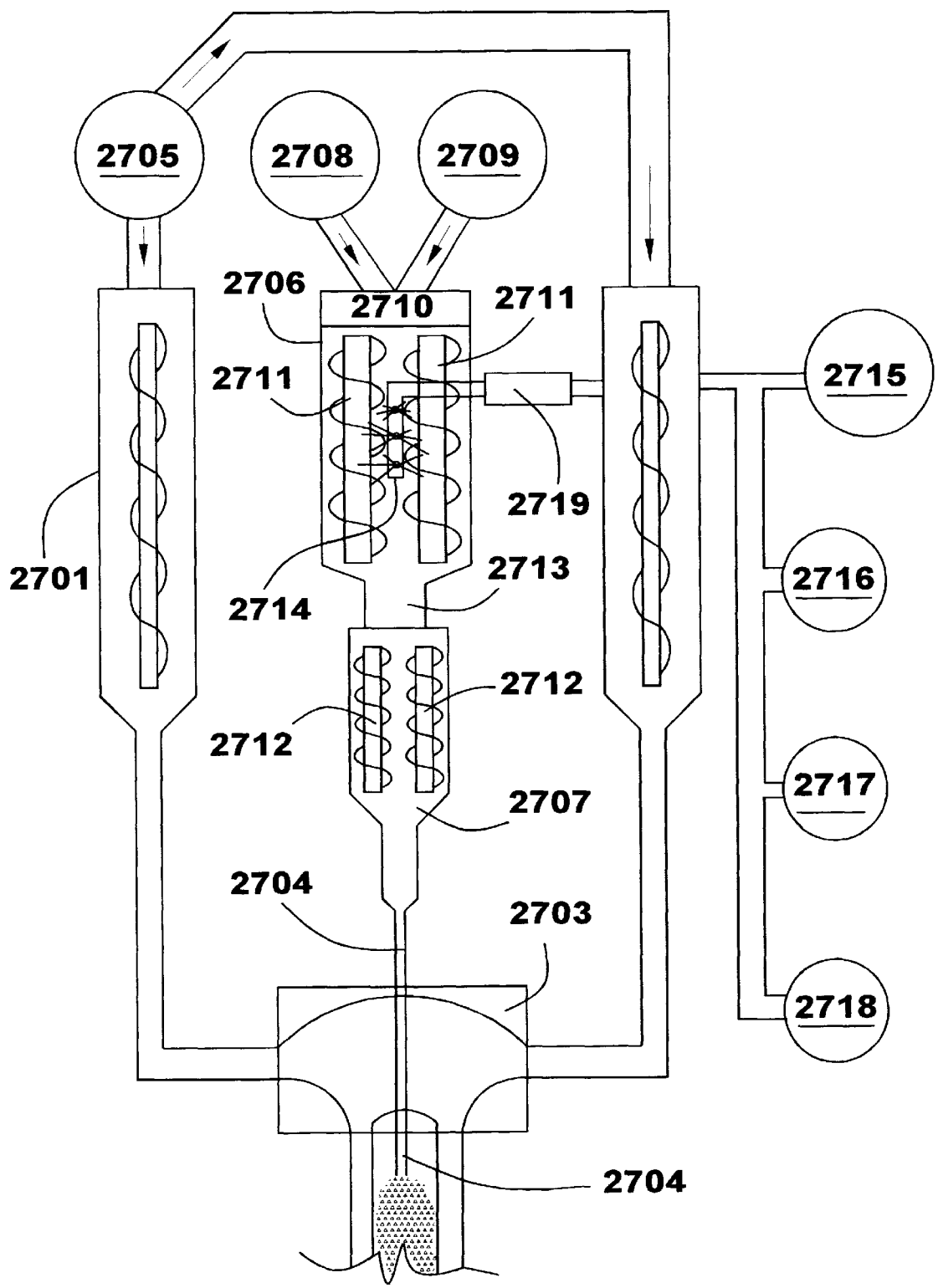
FIG. 19 is a schematic illustration of an apparatus for practicing the composite extrusion process of Phase III of the method of the invention.

A facility for practicing sub-phase 2700 of the method, production of the composite material through the composite extrusion process, is schematically illustrated in FIG. 19. The illustrated facility includes two identical screw driven extruder feed units 2701 and 2702, respectively, each of which feeds plastic material, heated to a suitable flow temperature, to an extrusion die unit 2703. Die unit 2703 includes dual inlets to and dual outlets from a pressure balancing manifold to feed the plastic material to an extrusion die from opposite sides of the die, thereby freeing the central portion of the die for extension of a filler material supply tube 2704 through the center of the die. Units 2701 and 2702 are of conventional design, and dual units are used so that plastic material can be supplied at a high flow rate to maximize the rate of extrusion production while maintaining the precise control needed to assure the proper extrusion of a uniform and continuous body. It will be understood that any suitable plastic material may be used to produce the body, or outer layer, of the composite material, although polyvinyl chloride is preferred because of its resistance to degradation and suitability for use in exposed environments. The plastic material used to form the body of the composite extrusion is supplied to units 2701 and 2702 in pellet or powder form from, e.g., a holding unit 2705, and is preferably supplied from the polymerizing/pelletizing sub-phase 2300.

The filler material and binder for the core of the composite extrusion are prepared in mixer units 2706 and 2707. Selected dry materials for the filler are drawn from, preferably, storage area 1900 of Phase II of the method for introduction to mixer unit 2706. The unit mass and density of the core material may be controlled within a wide range of specifications by selection of the characteristics of the materials included in the filler, but it should be noted that essentially any dry particulate matter of any composition or mix may be successfully used. In the illustrated facility, light material is fed to mixing unit 2706 from holding unit 2708, and heavy material is fed from holding unit 2709. The filler materials may be fed directly into mixing unit 2706, or may be premixed in a mixing hopper such as the unit shown as 2710. Mixing units 2706 and 2707 are high volume auger mixers with, preferably, twin augers 2711 and 2712, respectively, in each unit. The flow between units is controlled within transition conduit 2713.

As the filler material is mixed in unit 2706, binder material is introduced from a spray unit 2714, which sprays the binder in liquid form to begin distribution through the filler material to achieve a thorough mixing and coating of each particle of filler material with the binder. The binder material is a plastic resin, preferably drawn from plastics refining sub-unit 2200, and is preferably of the same family as the plastic material used to form the body or outer layer of the composite material. It is desirable that the binder material physically and chemically bond with the outer layer as the composite material is formed to assure the physical integrity of the structure, and physical interlock means (such as grooves or interlock projections formed in the outer layer) may be used as well.

The binder material resin, which may be conveyed directly from a sub-phase 2200 storage unit or through a holding unit 2715, is mixed with a catalyst, preferably heat activated, and other additives such as colorants and retardants drawn from holding units 2716, 2717, and 2718, and routed through a conventional mixer 2719 before the binder is sprayed into the dry filler. Following introduction of a heat activated catalyst to the binder resin, it is important that the core material not be allowed to prematurely reach activation temperature, and at least mixing unit 2707 should be chilled. Depending upon the equipment design used in a particular facility, and the retention time of the core material in mixing unit 2706, unit 2706 may be chilled as well.

The core material is forced from mixing unit 2707 and into supply tube 2704, which extends through and outward from die unit 2703. As the body or outer layer of the composite material is extruded from die unit 2703, the core material is pumped into the hollow interior by the force of augers 2712 at a rate controlled to fill the interior volume in coordination with the rate of extrusion of the outer layer. Supply tube 2704 extends from die unit 2703 in the direction of extrusion a sufficient distance to allow the outer layer to cool enough to set the configuration, thus preventing "ballooning" of the outer layer. However, it is important that the core material be pumped into the interior of the outer layer while that plastic material is sufficiently hot to activate the binder catalyst and achieve satisfactory polymerization of the binder. Because of the importance of these factors, the distance of extension of supply tube 2704 from die unit 2703 is preferably adjustable.

Figure 20:
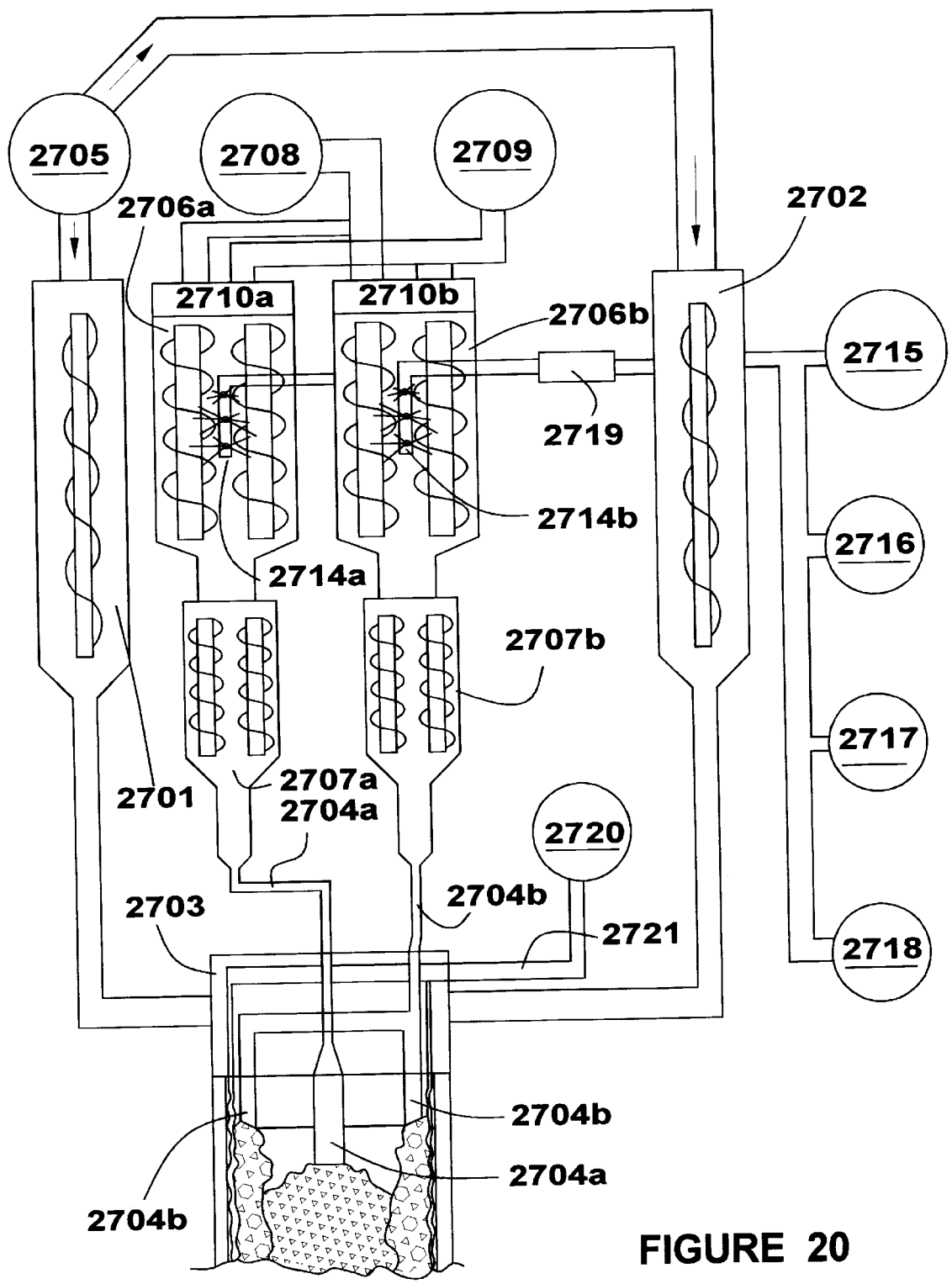
FIG. 20 is a schematic illustration of an apparatus for practicing an alternative embodiment of the composite extrusion process of Phase III of the method of the invention.

An alternative embodiment of a composite extrusion facility is schematically illustrated in FIG. 20. In the illustrated alternative embodiment, mixing units 2706 and 2707 are duplicated, and are designated by reference numerals 2706a and 2706b, and by 2707a and 2707b. Other components associated with the mixing units are also duplicated, and are similarly identified by addition of the letters "a" and "b" to the numerals used to identify the single components in FIG. 19, as will be readily apparent from the drawings. The mixing units are duplicated in the alternative embodiment to produce an alternative embodiment of the composite material. In the alternate material the outer layer is extruded as described above, but the interior is filled with a dual core comprising an outer core extending from the inner surface of the outer layer toward the center, and an inner core filling the central portion of the interior. The dual core design of the composite material allows the inner and outer cores to be formulated with different properties, such as density, and is predominantly intended for use in the production of extrusions with relatively large cross-sectional dimensions. For example, an extrusion product may be formed with a high density outer core for strength and rigidity, and a low density inner core to reduce the weight of the final product. It will be recognized that other variations in core compositions may also be used, to accomplish other purposes.

The dual cores are produced by pumping the core material into the interior of the outer layer extrusion through two supply outlets. In the illustration of FIG. 20, supply tube 2704b is split within or prior to entry into die unit 2703, and is modified to an annular configuration as it extends outward from die unit 2703. The outer core material is forced from the supply tube in an annular flow pattern along the inner surface of the outer layer. Supply tube 2704a extends through die unit 2703, and the inner core material is pumped through supply tube 2704a, in the same manner as previously described to fill the portion of the interior not occupied by the outer core material. Because the outer core material does not fill the entire interior volume, and thus, has a reduced tendency to deform the outer layer, it may be pumped into the interior earlier, or closer to die unit 2703. The inner core material is then pumped into the remaining interior volume after the outer core material, when the outer layer has cooled sufficiently to maintain its configuration. If desired, the inner surface of the outer layer may be coated with an adhesive or other binding material just before introduction of the outer core material, to help assure good adhesion between the outer layer and the outer core. The adhesive or the like, if used, is drawn from a holding unit 2720 and supplied through feed tube 2721.

The ready availability and extremely low cost of combustible waste components to a user of the method of the invention makes the conversion of such components into fuel products for commercial sale economically feasible. In fuel sub-phase 2800, combustible materials from Phase II, such as low grade paper, wood, and the like are combined with low grade materials recovered in plastics refining sub-phase 2200. More specifically, the solvent refining steps associated with the segregation and recovery of low density polyethylene produces paraffin compounds as a result of partial degradation of the polyethylene. Though the paraffins have little direct material value in the commercial market, they do contain heat value and their physical properties allow them to be used to bind other combustible materials for the production of compacted fuel products. Materials such as paper, wood, or other combustibles are mixed with the recovered paraffins and compressed to form relatively dense blocks of any convenient configuration. The compression partially melts the paraffins as the mixture compacts, and the resulting structure is maintained when the compression is released.

Organic waste constituents either unsuitable for, or available in quantities beyond the requirements for product production in other sub-phases, may be prepared for agricultural use by composting in sub-phase 2900. Conventional composting techniques well known to those skilled in the field are used in this sub-phase of the method of the invention. Because the materials routed to the composting unit have been processed through Phase II, the problems associated with inclusion of hazardous materials in solid waste compost are largely avoided, and the quality of the resulting compost product can be maintained at a high level.

The incinerator/power plant unit 3000 affords a user of the method of the invention the ability to recover the heat value of waste constituents that are unsuitable for or are generated in otherwise unusable quantities. The use of such materials as fuel in a highly efficient and properly controlled incineration unit for production of steam for process heat and/or generation of electricity reduces the cost of operation of a facility used to practice the method and improves the overall efficiency of the method. The design and operation of such an incineration/power plant unit to achieve efficient combustion of waste materials without significant environmental disadvantages is within the knowledge of those skilled in the art.

Figure 21:
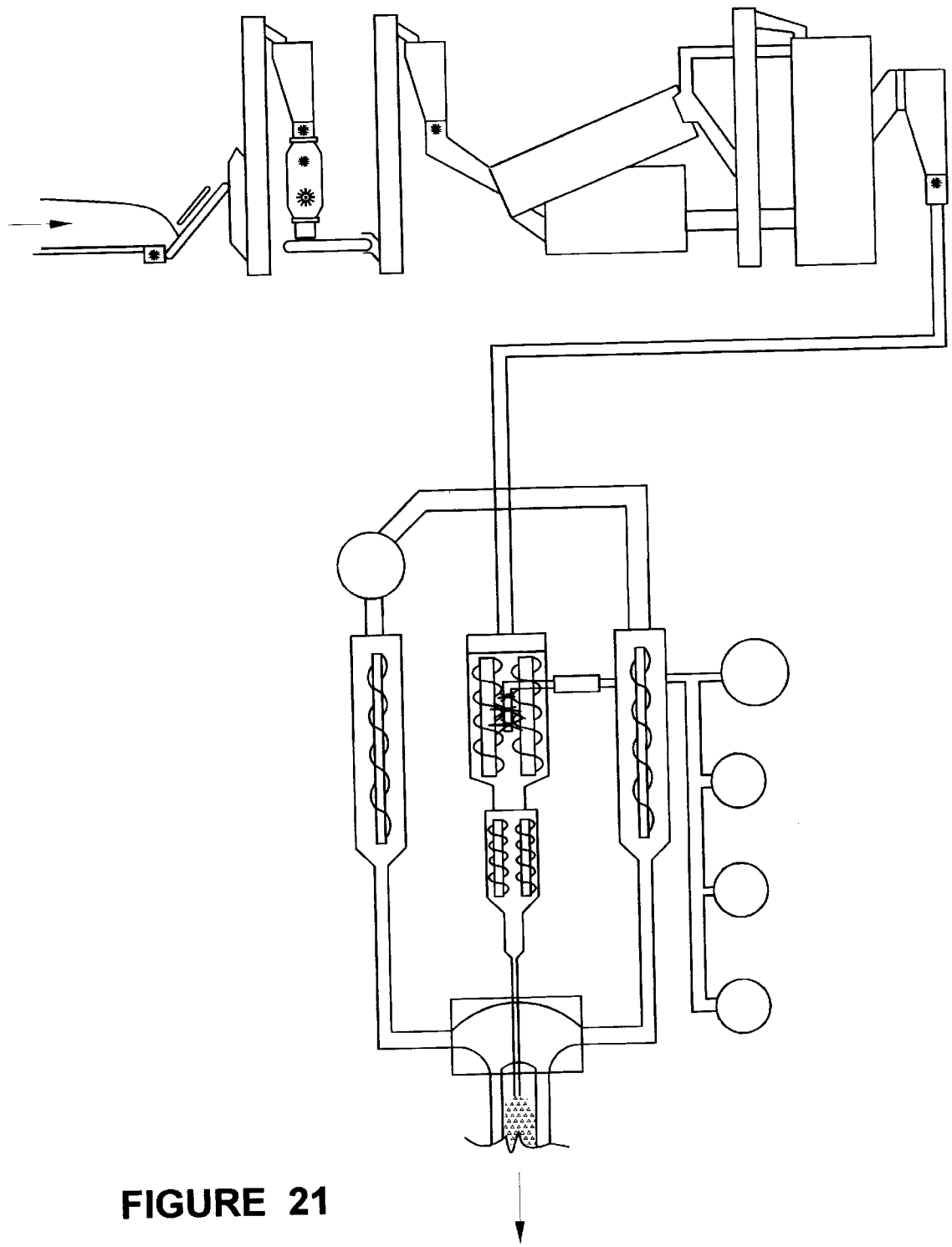
FIG. 21 is a schematic illustration of a facility for practicing a limited alternative embodiment of the method of the invention.
Figure 22:
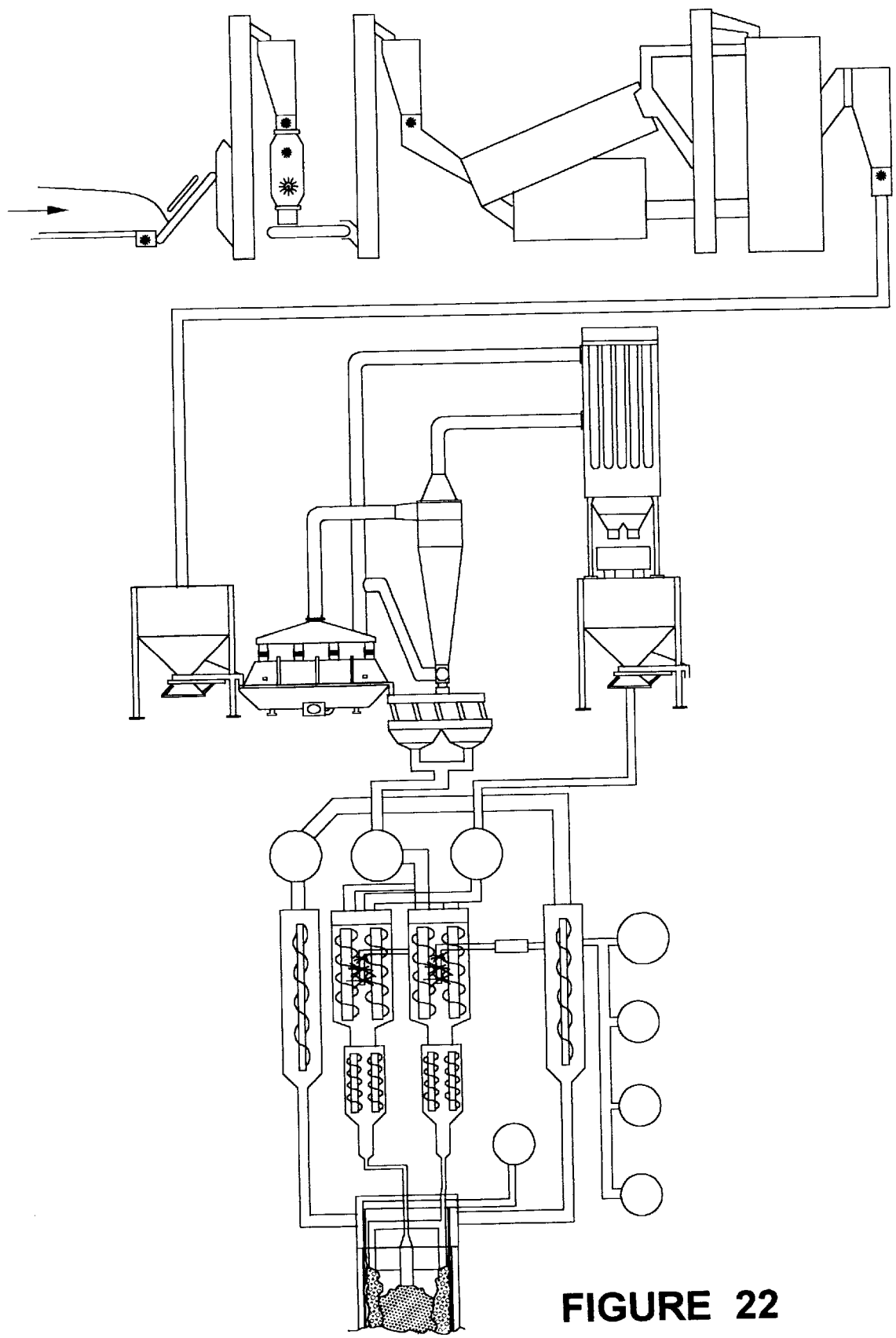
FIG. 22 is a schematic illustration of a facility for practicing a second limited alternative embodiment of the method of the invention.

In addition to the variations and alternatives described above, the overall method of the invention is readily susceptible to modification for particular facilities specifically designed to meet particular needs. It is contemplated, for example, that the utilization of simplified embodiments of the method may be advantageous, for a variety of reasons. Two illustrative simplified embodiments of the method of the invention are illustrated in FIGS. 21 and 22. In the embodiment of FIG. 21 the entire Phase II, or separation phase, of the method is omitted, and Phase III is limited to the composite extrusion sub-phase described above. In that embodiment, treated waste materials, dried and ground to uniform particle size in accordance with Phase I of the method, are supplied directly to a composite extrusion facility, such as the facility illustrated in FIG. 19. Since the material separation steps of Phase II of the preferred embodiment of the method are omitted, plastic material to form the outer layer of the composite material and plastic resin for use as a binder in the core may be imported to the facility. The plastic material and the plastic resin may be obtained from a related facility practicing the full embodiment of the invention, or may be obtained from other sources.

In the simplified embodiment of FIG. 22, a separation phase of limited scope is utilized to separate materials from Phase I into a heavy stream and a light stream, and those separated streams are introduced to a composite extrusion facility. Separation of the materials into light and heavy components enables the use of the alternative embodiment of the composite extrusion facility illustrated in FIG. 20 to produce composite materials with dual cores. Again, the plastic material for the outer layer and the plastic resin for the core binder may be obtained from a facility practicing a more extensive embodiment of the invention, or from any available source.

It should be noted that the method of the invention is designed with the inherent flexibility in the performance of the method steps to accommodate division of the phases of the method into geographically separated facilities, and to similarly accommodate physical division of the steps and sub-phases of the method. The method of the invention is also designed to accommodate the initial construction of facilities to practice the method in limited scale, with later expansion through addition of phases and/or sub-phases. As but one example, a Phase I facility may be initially constructed, and treated materials compacted into blocks and stored; a composite extrusion facility of Phase III may be later constructed to use both currently processed materials and stored materials; a Phase II facility may be next constructed to separate materials; and other sub-phases of Phase III then added, all under a comprehensive plan of implementation which allows a user to begin immediate alleviation of solid waste problems and progress to more extensive processing as warranted by economic factors and needs.

The foregoing description of the invention is illustrative and not for purposes of limitation. The method of the invention is susceptible to various modifications, and is also susceptible to use with alternative apparatus designs capable of performing the steps of the method without departing from the scope of the invention as claimed.

We claim:

1. A composite extrusion apparatus for producing, in a continuous composite extrusion process, a composite material having an outer layer of a plastic material surrounding a solid inner core of particles of solid material encapsulated in a matrix of polymerized plastic material formed from a catalyzed liquid resin, comprising a pair of plastic material extrusion units, each having a container to receive and hold plastic material, a plastic material conduit to convey molten plastic material from said container through said conduit, a screw auger for forcing molten plastic material through said conduit, and heating means for heating the plastic material in said container to a molten condition;

an extrusion die unit for the extrusion of the outer layer of the composite material therefrom, including a die outlet in the cross-sectional configuration of the outer layer, for the passage of flowable plastic material therethrough to form the outer layer of the composite material, and a manifold connected to said plastic material conduits of said plastic material extrusion units and connected to said die outlet to convey flowable plastic material therebetween;

a core material mixing and pumping unit, including a container to receive particles of solid material therein, a screw auger to mix material in said container and pump material from said container;

a resin inlet conduit for introducing catalyzed liquid resin to said core material mixing and pumping unit for mixing with said particles of solid material;

a supply tube connected to said core material mixing and pumping unit and extending through said extrusion die unit concentric with said die outlet to convey mixed particles of solid material and catalyzed liquid resin from said core material mixing and pumping unit through said extrusion die unit and into the interior of the outer layer as the outer layer is formed so as to form the solid inner core therein upon polymerization of the liquid resin.

2. The composite extrusion apparatus of claim 1, further comprising a second core material mixing and pumping unit, a second resin inlet conduit, and a second supply tube, connected and arranged in the same manner as the first of said core material mixing and pumping unit, resin inlet conduit, and supply tube, for the purpose of forming a two part core surrounded by the outer layer of the composite material.

3. A composite extrusion apparatus for producing, in a continuous composite extrusion process, a composite material having an outer layer of a plastic material surrounding a solid inner core of particles of solid material encapsulated in a matrix of polymerized plastic material formed from a catalyzed liquid resin, comprising a plastic material extrusion unit, having a container to receive and hold plastic material, a plastic material conduit to convey molten plastic material from said container through said conduit, a screw auger for forcing molten plastic material through said conduit, and heating means for heating the plastic material in said container to a molten condition;

an extrusion die unit for the extrusion of the outer layer of the composite material therefrom, including a die outlet in the cross-sectional configuration of the outer layer, for the passage of flowable plastic material therethrough to form the outer layer of the composite material, and a manifold connected to said plastic material conduit of said plastic material extrusion unit and connected to said die outlet to convey flowable plastic material therebetween;

a core material mixing and pumping unit, including a container to receive particles of solid material therein, a screw auger to mix material in said container and pump material from said container;

a resin inlet conduit for introducing catalyzed liquid resin to said core material mixing and pumping unit for mixing with said particles of solid material;

a supply tube connected to said core material mixing and pumping unit and extending through said extrusion die unit concentric with said die outlet to convey mixed particles of solid material and catalyzed liquid resin from said core material mixing and pumping unit through said extrusion die unit and into the interior of the outer layer as the outer layer is formed so as to form the solid inner core therein upon polymerization of the liquid resin.

4. A method of producing a composite material having an outer layer of a plastic material surrounding a solid inner core of particles of solid material encapsulated in a matrix of a binder material, comprising the steps of forming said outer layer by extrusion of said plastic material through an extrusion die so as to form a hollow body extending outwardly from said extrusion die, said body having a hollow interior and a side wall surrounding said hollow interior;

forming a pumpable slurry of said particles of solid material and said binder material with said binder material in an uncured liquid form;

pumping said slurry of said particles and said binder material into said interior of said hollow body through a conduit extending through said extrusion die, as said hollow body is formed, continuously filling said interior of said body as said body is formed; and curing said binder material to form said solid inner core of particles of solid material encapsulated in a matrix of binder material in the interior of said body, thereby forming said composite material.

5. The method of claim 4, wherein said binder material in uncured liquid form is a plastic resin material.

* * * * *